(12) United States Patent
Vaddadi et al.

(10) Patent No.: US 8,705,876 B2
(45) Date of Patent: Apr. 22, 2014

(54) IMPROVING PERFORMANCE OF IMAGE RECOGNITION ALGORITHMS BY PRUNING FEATURES, IMAGE SCALING, AND SPATIALLY CONSTRAINED FEATURE MATCHING

(75) Inventors: Sundeep Vaddadi, San Diego, CA (US); John H. Hong, San Diego, CA (US); Onur C. Hamsici, San Diego, CA (US); Yuriy Reznik, San Diego, CA (US); Chong U. Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 12/959,056

(22) Filed: Dec. 2, 2010

(65) Prior Publication Data

US 2011/0299770 A1  Dec. 8, 2011

Related U.S. Application Data

(60) Provisional application No. 61/265,955, filed on Dec. 2, 2009.

(51) Int. Cl.
*G06K 9/62* (2006.01)

(52) U.S. Cl.
USPC .......................................... 382/225

(58) Field of Classification Search
USPC .......................................... 382/225
See application file for complete search history.

(56) References Cited

U.S. PATENT DOCUMENTS

| | | | |
|---|---|---|---|
| 7,382,897 B2 | 6/2008 | Brown et al. | |
| 8,254,697 B2 * | 8/2012 | Isard et al. | 382/209 |
| 8,554,021 B2 * | 10/2013 | Kletter | 382/306 |
| 2005/0047647 A1 | 3/2005 | Rutishauser et al. | |
| 2006/0233423 A1 | 10/2006 | Najafi et al. | |
| 2007/0179918 A1 | 8/2007 | Heisele et al. | |
| 2007/0217676 A1 | 9/2007 | Grauman et al. | |
| 2009/0161962 A1 | 6/2009 | Gallagher et al. | |
| 2009/0324026 A1 * | 12/2009 | Kletter | 382/124 |
| 2011/0285810 A1 * | 11/2011 | Wagner et al. | 348/36 |

FOREIGN PATENT DOCUMENTS

JP    2011508310 A    3/2011

OTHER PUBLICATIONS (Wan-Lei Zhao, "On Evaluation of Keypoint Matching pattern for Image Near-Duplicate Detection", 2009, ACM-HK Student Research and Career Day).*

(Continued)

*Primary Examiner* — Samir Ahmed
*Assistant Examiner* — Totam Le
(74) *Attorney, Agent, or Firm* — Espartaco Diaz Hidalgo

(57) ABSTRACT

A method for feature matching in image recognition is provided. First, image scaling may be based on a feature distribution across scale spaces for an image to estimate image size/resolution, where peak(s) in the keypoint distribution at different scales is used to track a dominant image scale and roughly track object sizes. Second, instead of using all detected features in an image for feature matching, keypoints may be pruned based on cluster density and/or the scale level in which the keypoints are detected. Keypoints falling within high-density clusters may be preferred over features falling within lower density clusters for purposes of feature matching. Third, inlier-to-outlier keypoint ratios are increased by spatially constraining keypoints into clusters in order to reduce or avoid geometric consistency checking for the image.

33 Claims, 27 Drawing Sheets

*Exemplary Object Recognition Stages*

(56) References Cited

OTHER PUBLICATIONS

Boiman O et al., "In defense of Nearest-Neighbor based image classification", Computer Vision and Pattern Recognition, CVPR 2008, IEEE Conference on, IEEE, Piscataway, NJ, USA, Jun. 23, 2008, pp. 1-8, XP031297156, ISBN: 978-1-4244-2242-5.

International Search Report and Written Opinion—PCT/US2010/058805, ISA/EPO—Jul. 5, 2011.

Luo M, "SOFTCBIR: Object Searching in Videos Combining Keypoint Matching and Granduated Assignment", TR Maryland Univ, May 2006, XP002631474.

Sivic J et al., "Video data mining using configurations of viewpoint invariant regions", Conf CVPR, Jun. 27, 2004, XP002631473.

Szeliski R, "Computer Vision: Algorithms and Applications", Aug. 18, 2009, Springer, XP002631475, pp. 205-234, sect. 4.1.3 p. 216 sect, Scale invariance book available at http://szeliski.org/Book/.

Wang W. et al., "Object retrieval using configurations of salient regions", ACM Conf on Content-Based Image and Video Retrieval, 2008, pp. 67-74, XP002631472.

Zhong Wu et al., "Bundling features for large scale partial-dupliate web image search", Computer Vision and Pattern Recognition, CVPR 2009, IEEE Conference on, IEEE, Piscataway, NJ, USA, Jun. 20, 2009, pp. 25-32, XP031607093, ISBN: 978-1-4244-3992-8.

\* cited by examiner

FIG. 3 — *Exemplary Image Processing Stage – Scale Space Generation*

------ Correct Matches in Correct Target Image
............. Incorrect Matches in Correct Target Image
— · · — · Incorrect Matches with Incorrect Target Images

| Key Point In Query Cluster | Full Match (Above Threshold) /Cluster | Keypoint Scale | Partial Match (Below Threshold) /Cluster | Binary Key Point Match |
|---|---|---|---|---|
| D1 | NO | Low Scale | YES – Cluster j+2 Cluster j+3 | YES – Cluster j+2 |
| D2 | YES – Anchor Point Cluster j+2 Cluster j+3 | Medium Scale | - | - |
| D3 | YES – Anchor Point Cluster j+2 | Low Scale | - | - |
| D4 | YES – Anchor Point Cluster j Cluster j+2 | High Scale | - | - |
| D5 | NO | High Scale | YES - Cluster j+2 | YES – Cluster j+2 |
| D6 | NO | Medium Scale | NO | - |
| D7 | NO | Medium Scale | YES – Cluster j Cluster j+2 | YES – Cluster j+2 |
| D8 | NO | Medium Scale | NO | - |
| D9 | NO | Medium Scale | YES - Cluster j+2 | YES – Cluster j+2 |

FIG. 12

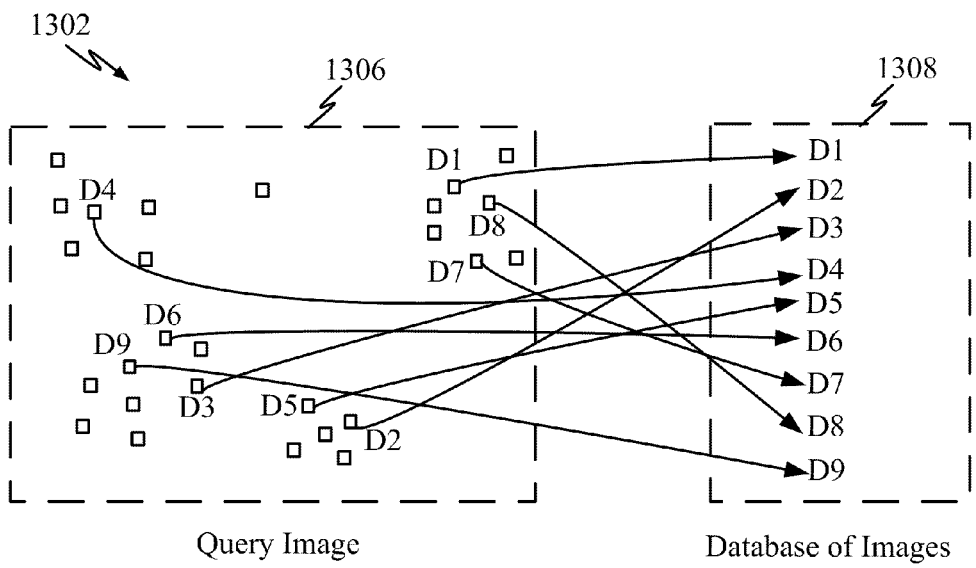
*Keypoint by Keypoint Matching*
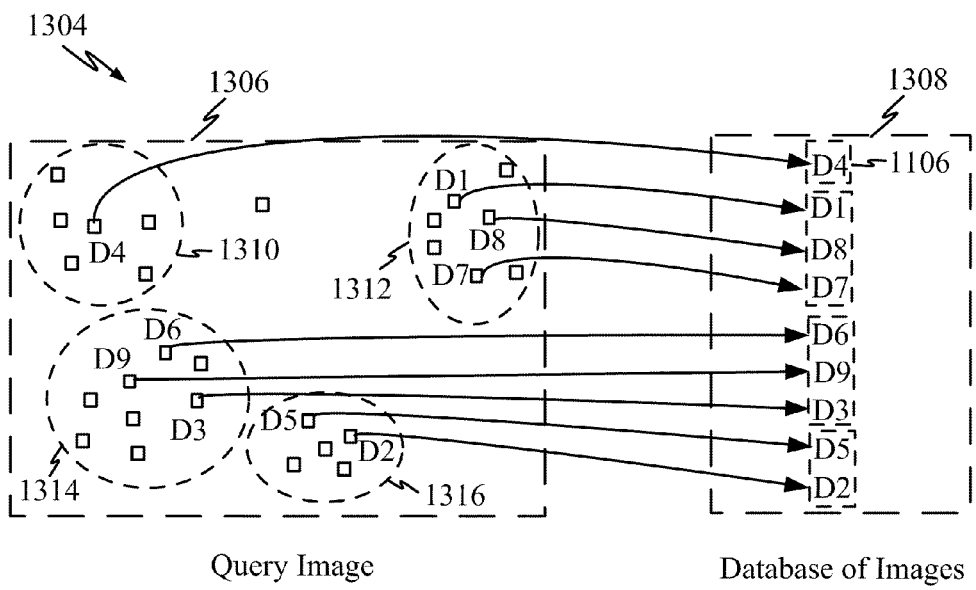
*Cluster by Cluster Matching*
FIG. 13

IMPROVING PERFORMANCE OF IMAGE RECOGNITION ALGORITHMS BY PRUNING FEATURES, IMAGE SCALING, AND SPATIALLY CONSTRAINED FEATURE MATCHING

CLAIM OF PRIORITY UNDER 35 U.S.C. §119

The present application for patent claims priority to U.S. Provisional Application No. 61/265,955 entitled "Improving Local Feature Classifier Performance and Efficiency and Convergence Rate of RANSAC by Using a Keypoint Clustering Method", filed Dec. 2, 2009, and assigned to the assignee hereof and hereby expressly incorporated by reference herein.

BACKGROUND

1. Field

One feature relates to computer vision, and more particularly, to methods and techniques for improving performance, efficiency, and reducing computational complexity of image recognition techniques.

2. Background

Various applications may benefit from having a machine or processor that is capable of identifying objects in a visual representation (e.g., an image or picture). The field of computer vision attempts to provide techniques and/or algorithms that permit identifying objects or features in an image, where an object or feature may be characterized by descriptors identifying one or more keypoints. These techniques and/or algorithms are often also applied to face recognition, object detection, image matching, 3-dimensional structure construction, stereo correspondence, and/or motion tracking, among other applications. Generally, object or feature recognition may involve identifying points of interest (also called keypoints) in an image for the purpose of feature identification, image retrieval, and/or object recognition. Preferably, the keypoints may be selected and the patch(es) around them processed such that they are invariant to image scale changes and/or rotation and provide robust matching across a substantial range of distortions, changes in point of view, and/or noise and change in illumination. Further, in order to be well suited for tasks such as image retrieval and object recognition, the feature descriptors may preferably be distinctive in the sense that a single feature can be correctly matched with high probability against a large database of features from a plurality of target images.

After the keypoints in an image are detected and located, they may be identified or described by using various descriptors. For example, descriptors may represent the visual features of the content in images, such as shape, color, texture, and/or rotation, among other image characteristics. The individual features corresponding to the keypoints and represented by the descriptors are then matched to a database of features from known objects. Therefore, a correspondence searching system can be separated into three modules: keypoint detector, feature descriptor, and correspondence locator. In these three logical modules, the descriptor's construction complexity and dimensionality have direct and significant impact on the performance of the feature matching system.

Such feature descriptors are increasingly finding applications in real-time object recognition, 3D reconstruction, panorama stitching, robotic mapping, video tracking, and similar tasks. Depending on the application, transmission and/or storage of feature descriptors (or equivalent) can limit the speed of computation of object detection and/or the size of image databases. In the context of mobile devices (e.g., camera phones, mobile phones, etc.) or distributed camera networks, significant communication and power resources may be spent in transmitting information (e.g., including an image and/or image descriptors) between nodes. Feature descriptor compression is hence important for reduction in storage, latency, and transmission.

Computer vision and/or image capture implementations tend to be processing intensive. Object recognition is often hampered by an imprecise feature matching process that is exacerbated by affine transformations and other distortions, leading to reduced true positives (recognition) and increased false positives (reduced precision). In areas of computer vision such as the classifier stage of object recognition systems, wide baseline stereo matching, and pose estimation, an important step is the fitting of a correct model using contaminated data. A basic assumption is that the data consists of "inliers", i.e., data (or points) whose distribution can be explained by some set of model parameters, and "outliers" which are data that do not fit the model. Geometric consistency or verification is often imposed to reject outliers after the matching process in an object recognition system but the computational cost is high and often prevents real-time operation of object recognition systems. The parameters of a data fitting model might be used, for example, for the estimation of a fundamental matrix in stereo matching or projective transformation for outlier rejection in object recognition and outlier rejection in image stitching. For example, RANdom SAmple Consensus (RANSAC) is a data fitting model widely used to work with contaminated data and works by randomly sampling a set of points from data to estimate model parameters and iteratively verify against all the data to determine the fitting. However, as the ratio of inliers to outliers drops, a RANSAC algorithm becomes exponentially slower (i.e., slower convergence rate).

Therefore, there is a need to improve the slow convergence rate of geometric verification techniques and/or eliminate the need for geometric verification.

SUMMARY

The following presents a simplified summary of one or more embodiments in order to provide a basic understanding of some embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Various features are provided for improving feature matching in image recognition systems.

According to a first aspect, inlier-to-outlier keypoint ratios may be increased by spatially constraining keypoints into clusters. A plurality of keypoints are obtained for an image for a query image. A keypoint may be a local maxima pixel or a local minima pixel in a scale space for the query image. For example, keypoints may be ascertained across a plurality of scale spaces corresponding to blurred versions of the query image. In some instances, keypoints may be represented by descriptors which are used for keypoint matching.

A set of keypoint clusters is then defined for the query image based on keypoint distribution (e.g., for the plurality of keypoints). Keypoints may be clustered based on at least one of: (a) spatial locations of the keypoints across a scale space for the query image, or (b) scale levels in the scale space at which the keypoints are detected.

Anchor matches for the query image may then be established by matching at least a subset of keypoints for the query image to keypoints for one or more target images. Anchor matches may be keypoints matches that are matched beyond a threshold with keypoints in one or more target images. The threshold is selected so as to exclude outlier matches, where outlier matches are false positive keypoint matches. Additionally, scale level priority may be imposed so that anchor matches are keypoint matches for keypoints in the query image that occur within a selected subset of levels of the scale space for the query image. Anchor matches may refer to those keypoint matches that are matched at least partially based on local pixel information around each of the subset of keypoints for the query image. The local pixel information may include at least one of pixel gradient, pixel color, cluster shape, or keypoint distribution.

Even after anchor matches, other keypoints in the query keypoint cluster may be retained if such keypoints are at least partially matched to keypoints in the target keypoint cluster. However, keypoints may be excluded from the query keypoint cluster if such keypoints are unmatched or are matched to keypoints in a cluster other than the target keypoint cluster.

In one example, establishing anchor matches may include: (a) matching keypoints in the query image to keypoints in the target images; and/or (b) retaining keypoint match information for keypoints in the query image for a subsequent binary determination as to whether a keypoint should be excluded from its corresponding keypoint cluster.

Subsequently, a query keypoint cluster may be matched to a target keypoint cluster based on a subset of the anchor matches.

Note that a keypoint match below the threshold may be considered a partial match. For these partial matches, after the query keypoint cluster has been matched to the target keypoint cluster, keypoints in the query keypoint cluster may be retained in the cluster based on a binary decision. The binary decision for a keypoint in the query keypoint cluster may be based on whether a partial match has been found for the keypoint and such match is within the target keypoint cluster.

According to a second feature, instead of using all detected features in an image for feature matching, keypoints may be pruned based on cluster density and/or the scale level in which the keypoints are detected. For instance, keypoints falling within high-density clusters may be preferred over features falling within lower density clusters for purposes of feature matching. In one example, the keypoints for the query image are obtained across a plurality of image scale spaces. Then, the number of keypoints for the query image may be reduced by: (a) pruning one or more lower density clusters from the set of keypoint clusters, and/or (b) pruning keypoints detected at lower levels of scale spaces of the query image from at least some of the clusters in the set of keypoint clusters. For this purpose a keypoint density may be obtained for each of the clusters in the set of keypoint clusters.

Subsequently, descriptors for the reduced number of keypoints may be generated for the query image. The pruned keypoints and/or clusters may be discarded prior to generating descriptors. The descriptors for the reduced number of keypoints may then be transmitted to a feature matching device to match the query image or object in the query image to target images.

According to a third feature, image scaling may be performed based on a feature distribution across scale spaces for an image to estimate image size/resolution, where peak(s) in the keypoint distribution at different scales is used to track a dominant image scale and roughly track object sizes. A distribution of keypoints may be obtained across a plurality of scale spaces for the query image. The scale for the query image may then be estimated based on the distribution of keypoints. The image scale may be estimated from the distribution of the keypoints over the scale spaces such that a cutoff scale preserves a threshold percentage of keypoints within the space scales up to the cutoff scale. A kernel size for clustering keypoints may then be selected based on the estimated query image scale. Blurred versions of the query image at the selected kernel size may then be utilized to perform keypoint clustering.

Similarly, a feature matching device is provided comprising a storage device and a processing circuit. The storage device may store information for a plurality of target images. The processing circuit may be adapted to: (a) obtain a plurality of keypoints for a query image, (b) define a set of keypoint clusters for the query image based on keypoint distribution, (c) establish anchor matches for the query image by matching at least a subset of keypoints for the query image to keypoints for one or more target images, and/or (d) match a query keypoint cluster to a target keypoint cluster based on a subset of the anchor matches.

BRIEF DESCRIPTION OF THE DRAWINGS

Various features, nature, and advantages may become apparent from the detailed description set forth below when taken in conjunction with the drawings in which like reference characters identify correspondingly throughout.

FIG. 12 is a table illustrating that further details the results of FIG. 11.

FIG. 13 is a block diagram illustrating the improvement of cluster by cluster matching over keypoint by keypoint matching.

DETAILED DESCRIPTION

Figure 1:
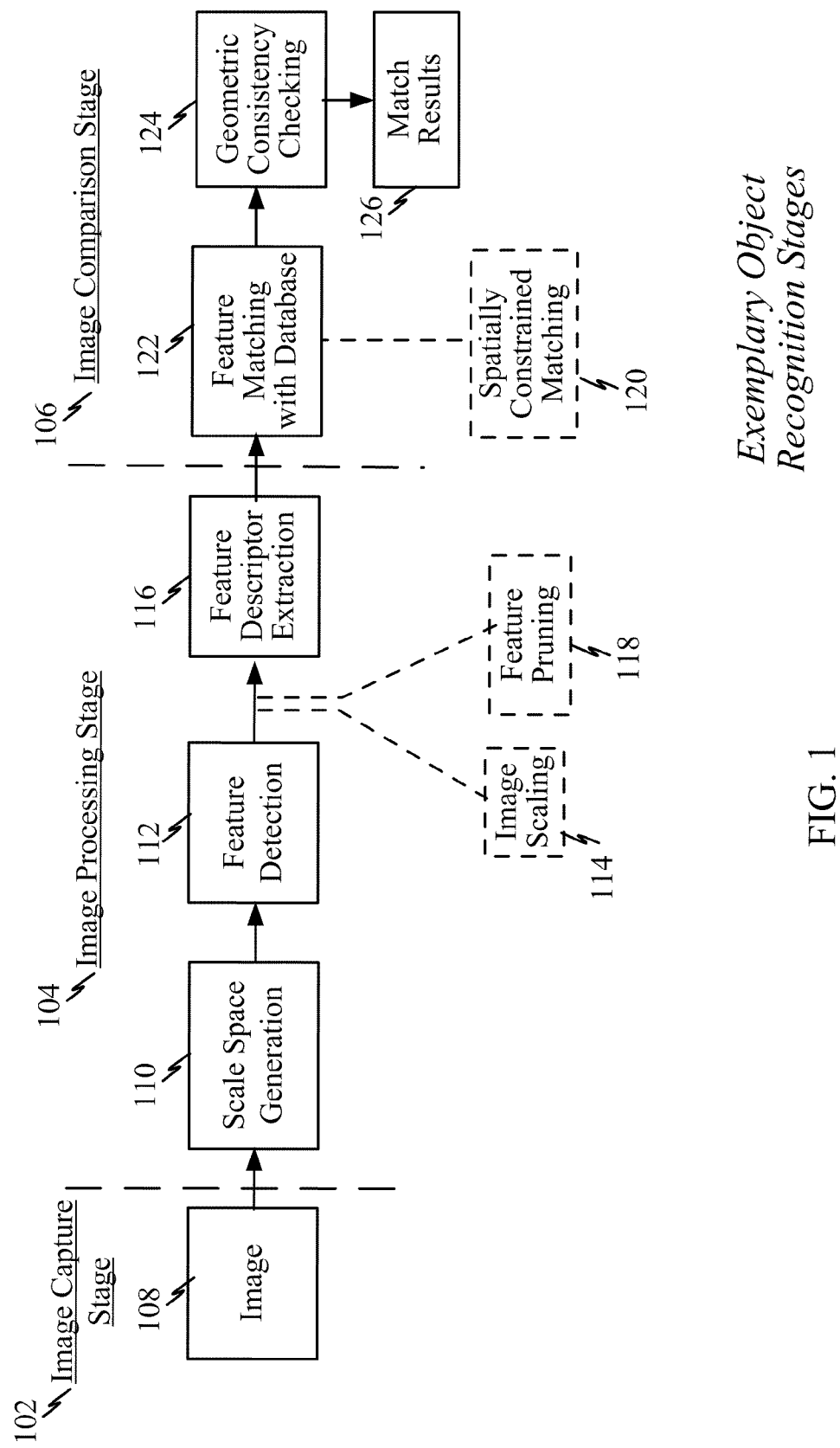
FIG. 1 is a block diagram illustrating the functional stages for performing object recognition on a queried image.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Overview

Various features described herein relate to improving the speed and/or efficiency of image recognition.

According to a first aspect, keypoints in a query image are grouped into clusters. Keypoints from a query cluster are matched to target clusters based on a high correspondence threshold. Query keypoints that meet the threshold (or better) are full matches and are considered anchor points. Query keypoints that do meet the threshold but yet have a corresponding target keypoint are partial matches. Correspondence between the query cluster and a target cluster is then established based on the anchor points. Additional keypoints having a partial match within the corresponding target cluster are brought into the query cluster. All other query keypoints (unmatched keypoints or matched to a different target cluster) are ignored in the query cluster. Because the partial matched keypoints are brought in as a binary decision (not a threshold/probabilistic decision as in anchor point matching), all possible inliers keypoints are accepted even if there are spatially repeating structures.

According to a second aspect, the resolution of an image is roughly estimated based on the keypoint distribution observed at different scales of a scale space pyramid (e.g., Gaussian scale space) for the image. Peak(s) in the keypoint distribution at different scales can be used to track the dominant image scale and roughly track the object size. This observation is used to get an estimate of the size of the object and make a kernel size radius R proportional to it. Specifically, object size is selected by the minimum scale level that includes a certain threshold percentage of all keypoints detected at this or smaller (lower) scale. If a significant percent of the keypoints are found at higher scales of the scale space pyramid or uniformly spread across scales, then this indicates that the image has a high resolution. Otherwise, if keypoints are concentrated at lower scales, this indicates that the image has low resolution.

According to a third aspect, the number of keypoints may be pruned to reduce computational complexity during the feature matching stage. Two approaches to pruning/reducing keypoint include: (a) pruning keypoints based on cluster density and (b) pruning keypoints based on detection scale. According to the first approach, in order to reduce the keypoint clusters that are used for matching between a query image and a target image, keypoint clusters having a higher density of keypoints are selected while the remaining keypoint clusters (i.e., lower keypoint density) are pruned or ignored during subsequent feature matching. According to the second approach, keypoints detected at higher scales (lower resolutions) are preserved and keypoints at lower scales (higher resolutions) are pruned or ignored for purposes of feature matching.

Exemplary Object Recognition Process

FIG. 1 is a block diagram illustrating the functional stages for performing object recognition on a queried image. At an image capture stage 102, an image 108 of interest (i.e., the queried image) may be captured. In an image processing stage 104, the captured image 108 is then processed by generating a corresponding scale space 110 (e.g., Gaussian scale space), performing feature detection 112, and performing feature descriptor extraction 116. Feature detection 112 may identify highly distinctive keypoints and/or keypoints of geometrical interest for the captured image 108 which can subsequently be used in feature descriptor extraction 116 to obtain a plurality of descriptors. At an image comparison stage 106, these descriptors are used to perform feature matching 122 (e.g., by comparing keypoints and/or other characteristics of keypoints or patches surrounding the keypoints) with a database of known descriptors. Geometric verification or consistency checking 124 is then performed on keypoint matches to ascertain correct feature matches and provide match results 126. In this manner a queried image may be compared to, and/or identified from, a database of target images.

According to a first aspect, image scaling 114 may be based on feature density or distribution across scale spaces to estimate image size/resolution. Peak(s) in the keypoint distribution at different scales is used to track the dominant image scale and roughly track the object size. If a significant percent of the keypoints are found at higher scales of the scale space pyramid (e.g., Gaussian scale space pyramid) or uniformly spread across scales, then this indicates that the image has a high resolution. Otherwise, if keypoints are concentrated at lower scales, this indicates that the image has low resolution. This allows selecting a kernel size radius R proportional to such estimated image size. For instance, object size is selected by the minimum scale level that includes a certain threshold percentage of all keypoints detected at this or smaller (lower) scale.

According to a second aspect, feature pruning 118 may be performed to reduce the number of features that need to be processed and/or matched. Instead of using all detected features for feature matching, features (i.e., keypoints) are pruned based on cluster density and/or the scale in which they are detected. That is, features falling within high-density cluster may be preferred over features falling within lower density clusters for purposes of feature matching.

According to a third aspect, spatially constrained feature matching 120 may be performed. To increase inlier-to-outlier keypoint ratios and reduce or avoid geometric consistency checking for a query image, keypoint matches between the query image and a target image may be based on keypoint clustering. Clusters may be defined by grouping nearby keypoints together. Then, keypoint matching (with a high threshold) is performed between the query image and one or more target images. Keypoints for which a full match (match above the threshold) is found are considered anchor points. Query image clusters and target images may be matched based on the anchor points matched. Binary keypoint matching may then be performed where any of the keypoints for which a partial match (match below the threshold) was previously found within the selected target image cluster (by the corresponding anchor points) are included as part of the cluster. Unmatched keypoints and/or wrongly matched keypoints are excluded from the query cluster for purposes of image recognition.

Figure 2:
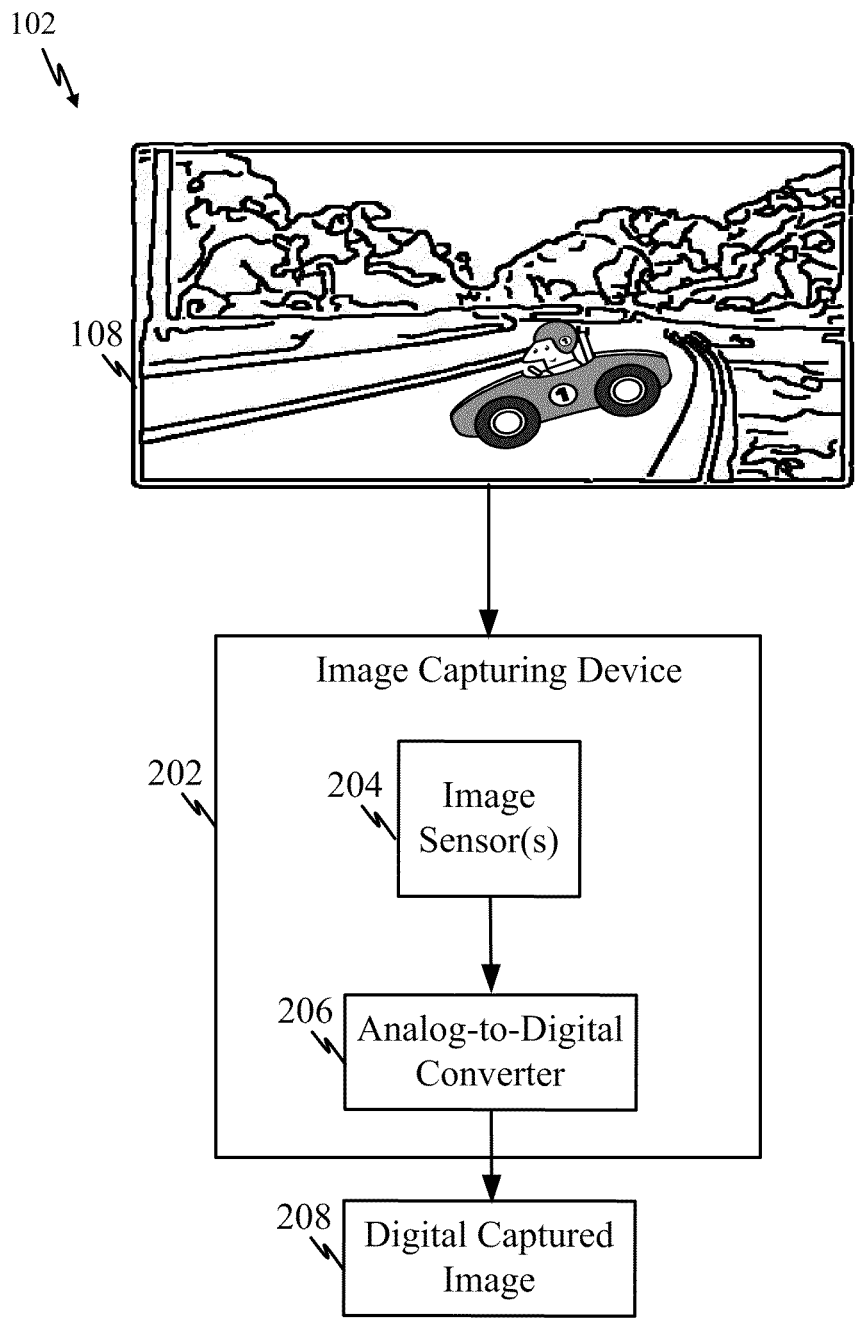
FIG. 2 illustrates an exemplary image capture stage.

FIG. 2 illustrates an exemplary image capture stage 102. Here, the image 108 may be captured by an image capturing device 202, which may include one or more image sensors 204 and/or an analog-to-digital converter, to obtain a digital captured image 208. The image sensors 204 (e.g., charge coupled devices (CCD), complementary metal semiconductors (CMOS)) may convert light into electrons. The electrons may form an analog signal that is then converted into digital values by the analog-to-digital converter 206. In this manner, the image 108 may be captured in a digital format that may define the image I(x, y), for example, as a plurality of pixels with corresponding color, illumination, and/or other characteristics.

Figure 3:
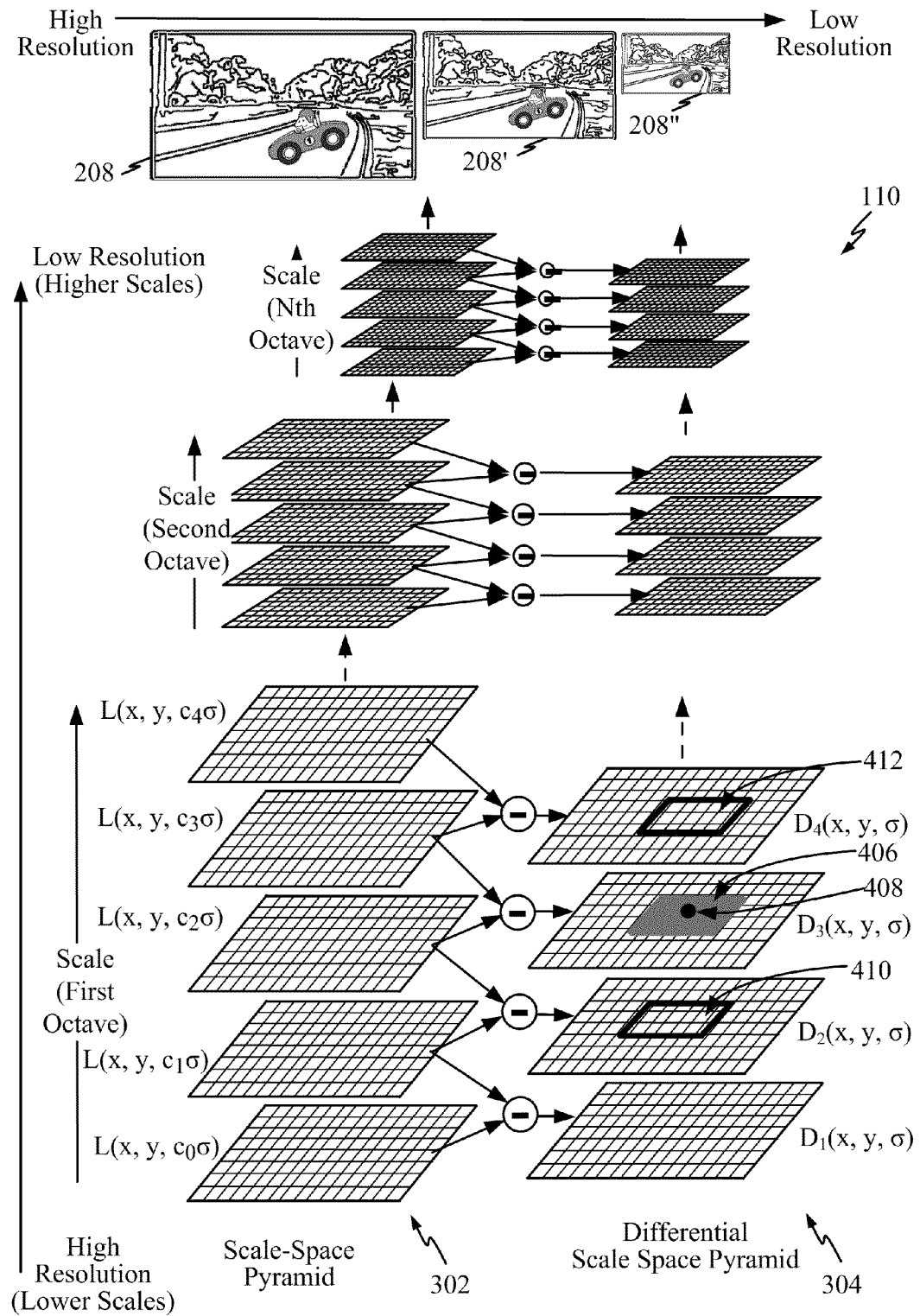
FIG. 3 illustrates scale space generation in an exemplary image processing stage.

FIG. 3 illustrates scale space generation in an exemplary image processing stage 104. A number of algorithms, such as Scale Invariant Feature Transform (SIFT), have been developed to perform feature detection in images. A first step towards detection of particular objects in an image is classifying the queried object based on its local features. The goal is to identify and select features that are invariant and/or robust to, for example, illumination, image noise, rotation, scaling, and/or small changes in viewpoint. That is, matches between a query image and a comparison target image should be found despite differences in illumination, image noise, rotation, scale, and/or viewpoint between the two images. One way to do this is to perform extrema detection (e.g., local maxima or minima) on patches of an image to identify highly distinctive features (e.g., distinctive points, pixels, and/or regions in the image).

SIFT is one approach for detecting and extracting local features that are reasonably invariant to changes in illumination, image noise, rotation, scaling, and/or small changes in viewpoint. The image processing stage 104 for SIFT may include: (a) scale-space extrema detection, (b) keypoint localization, (c) orientation assignment, and/or (d) generation of keypoint descriptors. It should be clear that alternative algorithms for feature detection and, subsequent feature descriptor generation, including Speed Up Robust Features (SURF), Gradient Location and Orientation Histogram (GLOH), Local Energy based Shape Histogram (LESH), Compressed Histogram of Gradients (CHoG), among others, may also benefit from the features described herein.

In scale space generation 110, the digital image I(x, y) 208 (FIG. 2) is gradually blurred or smoothened to construct the scale-space pyramid 302. Blurring (smoothing) generally involves convolving the original image I(x, y) with the blurring/smoothing function G(x, y, cσ) at scale cσ such that the blurred/smoothed image L(x, y, cσ) is defined as L(x, y, cσ)=G(x, y, cσ)*I(x, y). Here, the blurring/smoothing function G is a spatial filter kernel (e.g., a Gaussian or a Laplacian of Gaussian, among others), cσ denotes the standard deviation of the blurring/smoothening function G that is used for blurring the image I(x, y). As multiplier c, is varied ($c_0 < c_1 < c_2 < c_3 < c_4$), the standard deviation cσ varies and a gradual blurring/smoothing is obtained. Sigma σ is the base scale variable (essentially the width of the Gaussian kernel). When the initial image I(x, y) is incrementally convolved with blurring/smoothening function G to produce the blurred images L, the blurred images L are separated by the constant factor c in the scale space. As the number of blurred (smoothened) images L increase and the approximation provided for the scale space pyramid 302 approaches a continuous space, the two scales also approach one scale. In one example, the convolved images L may be grouped by octave, where an octave may correspond to a doubling of the value of the standard deviation σ. Moreover, the values of the multipliers c (e.g., $c_0 < c_1 < c_2 < c_3 < c_4$), may be selected such that a fixed number (e.g., a plurality) of convolved images L are obtained per octave. Each octave of scaling may correspond to an explicit image resizing. Thus, as the original image I(x,y) is blurred/smoothened by the gradually blurring/smoothening function G, the number of pixels is progressively reduced.

A differential scale space (e.g., a difference of Gaussian (DoG)) pyramid 304 may be constructed by computing the difference of any two consecutive blurred images in the scale space pyramid 302. In the differential scale space 304, D(x, y, σ)=L(x, y, $c_n$σ)−L(x, y, $c_{n-1}$σ). A differential image D(x, y, σ) is the difference between two adjacent blurred/smoothed images L at scales $c_n$σ and $c_{n-1}$σ. The scale of the D(x, y, σ) lies somewhere between $c_n$σ and $c_{n-1}$σ. The differential images D may be obtained from adjacent blurred images L per octave. After each octave, the image may be downsampled by a factor of 2 and then the process is repeated. In this manner an image may be transformed into local features that are robust or invariant to translation, rotation, scale, and/or other image parameters and/or distortions.

Once generated, the differential scale space 304 for a queried image may be utilized for extrema detection to identify features of interest (e.g., identify highly distinctive points in the image). These highly distinctive points are herein referred to as keypoints. These keypoints may be identified by the characteristics of a patch or local region surrounding each keypoint. A descriptor may be generated for each keypoint and its corresponding patch, which can be used for comparison of keypoints between a query image and stored target images. A "feature" may refer to a descriptor (i.e., a keypoint and its corresponding patch). A group of features (i.e., keypoints and corresponding patches) may be referred to as a cluster.

Figure 4:
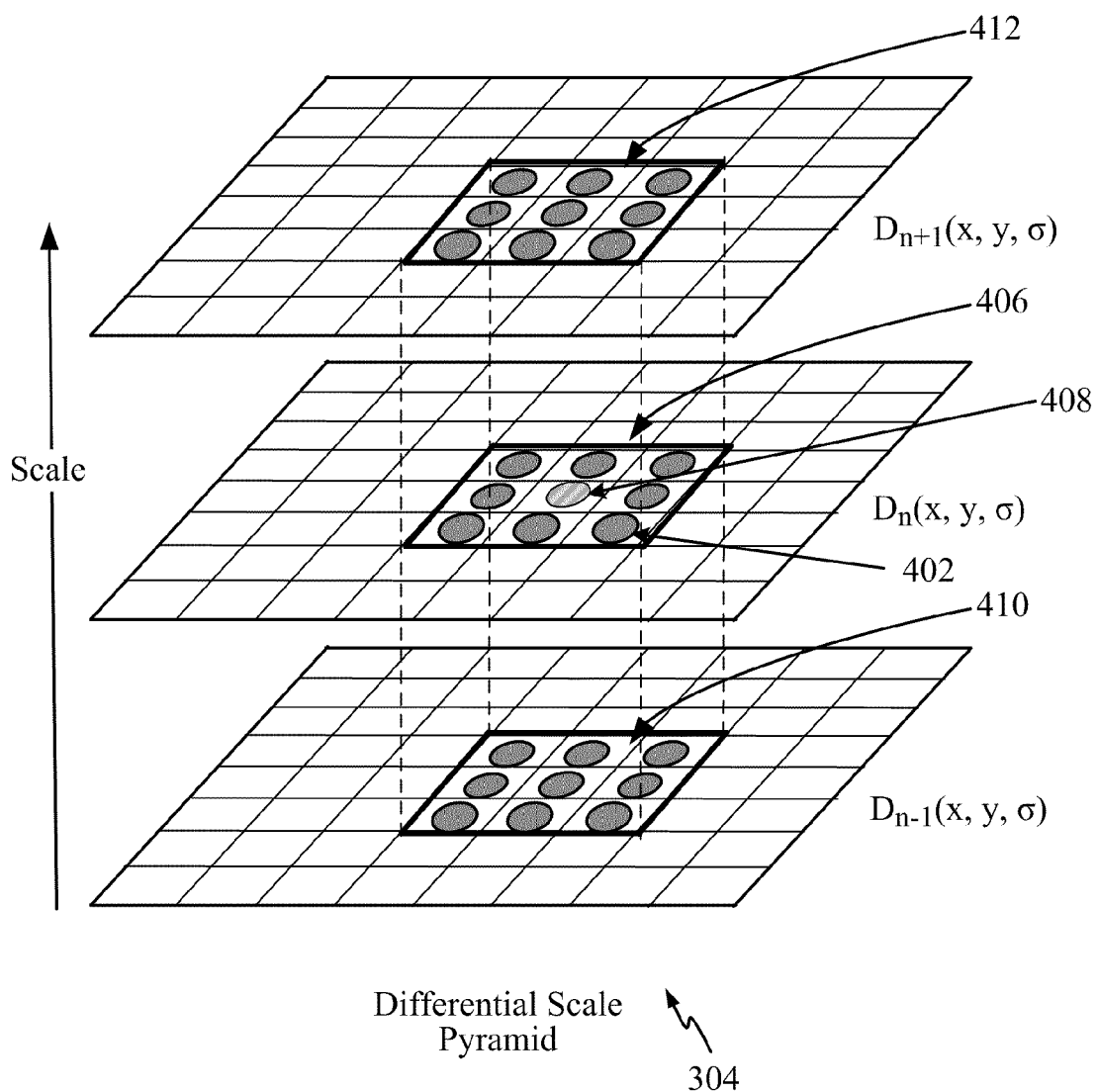
FIG. 4 illustrates feature detection in the exemplary image processing stage.

FIG. 4 illustrates feature detection in the exemplary image processing stage 104. In feature detection 112, the differential scale space 304 may be used to identify keypoints for the image I(x, y). Feature detection 112 seeks to determine whether a local region or patch around a particular sample point or pixel in the image is a potentially interesting patch (geometrically speaking).

Generally, local maxima and/or local minima in the differential scale space 304 are identified and the locations of these maxima and minima are used as keypoint locations in the differential scale space 304. In the example illustrated in FIG. 4, a keypoint 408 has been identified with a patch 406. Finding the local maxima and minima (also known as local extrema detection) may be achieved by comparing each pixel (e.g., the pixel for keypoint 408) in the differential scale space 304 to its eight neighboring pixels at the same scale and to the nine neighboring pixels (in adjacent patches 410 and 412) in each of the neighboring scales on the two sides of the keypoint 408, for a total of 26 pixels (9×2+8=26). Here, the patches are defined as 3×3 pixel regions. If the pixel value for the keypoint 408 is a maximum or a minimum among all twenty-six (26) compared pixels in the patches 406, 410, and 412, then it is selected as a keypoint. The keypoints may be further processed such that their location is identified more accurately and some of the keypoints, such as the low contrast keypoints and edge keypoints may be discarded.

Figure 5:
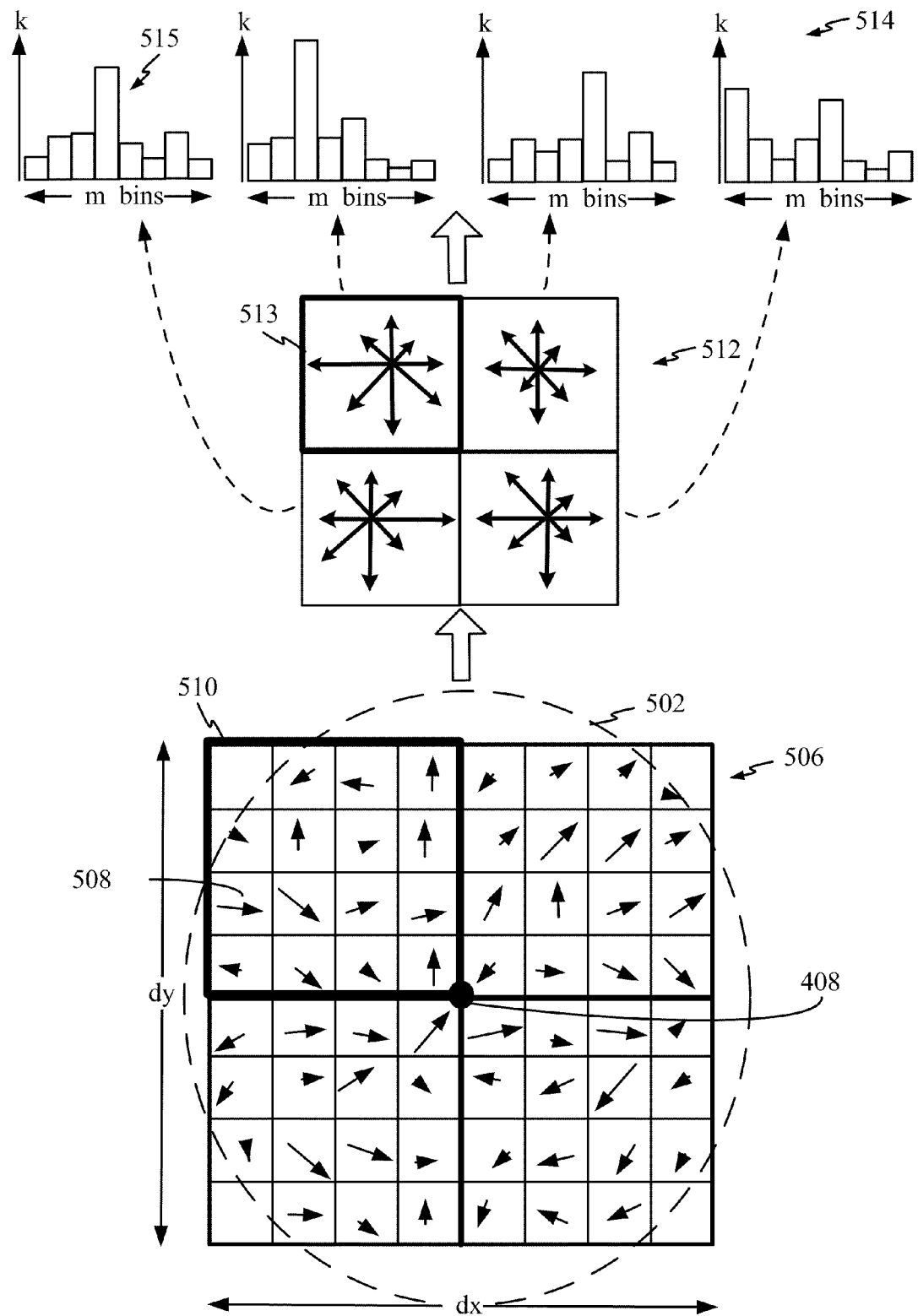
FIG. 5 illustrates feature descriptor extraction in the exemplary image processing stage.

FIG. 5 illustrates feature descriptor extraction in the exemplary image processing stage 104. Generally, a feature (e.g., a keypoint and its corresponding patch) may be represented by a descriptor, which allows for efficient comparison of the feature (from a query image) to features stored in a database of target images. In one example of feature descriptor extraction 116, each keypoint may be assigned one or more orientations, or directions, based on the directions of the local image gradient. By assigning a consistent orientation to each keypoint based on local image properties, the keypoint descriptor can be represented relative to this orientation and therefore achieve invariance to image rotation. Magnitude and direction calculations may be performed for every pixel in the neighboring region around the keypoint 408 in the blurred image L and/or at the keypoint scale. The magnitude of the gradient for the keypoint 408 located at (x, y) may be represented as m(x, y) and the orientation or direction of the gradient for the keypoint at (x, y) may be represented as Γ(x, y). The scale of the keypoint is used to select the blurred/smoothed image, L, with the closest scale to the scale of the keypoint 408, so that all computations are performed in a scale-invariant manner. For each image sample, L(x, y), at this scale, the gradient magnitude, m(x, y), and orientation, Γ(x, y), are computed using pixel differences. For example the magnitude m(x,y) may be computed as:

$$m(x, y) = \sqrt{(L(x+1, y) - L(x-1, y))^2 + (L(x, y+1) - L(x, y-1))^2}.$$ (Equation 1)

The direction or orientation Γ(x, y) may be calculated as:

$$\Gamma(x, y) = \arctan\left[\frac{(L(x, y+1)L(x, y-1)}{(L(x+1, y) - L(x-1, y)}\right].$$ (Equation 2)

Here, L(x, y) is a sample of the blurred image L(x, y, σ), at scale σ which is also the scale of the keypoint.

The gradients for the keypoint 408 may be calculated consistently either for the plane in the scale space pyramid that lies above, at a higher scale, than the plane of the keypoint in the differential scale space or in a plane of the scale space pyramid that lies below, at a lower scale, than the keypoint. Either way, for each keypoint, the gradients are calculated all at one same scale in a rectangular area (e.g., patch) surrounding the keypoint. Moreover, the frequency of an image signal is reflected in the scale of the blurred image. Yet, SIFT simply uses gradient values at all pixels in the patch (e.g., rectangular area). A patch is defined around the keypoint; sub-blocks are defined within the block; samples are defined within the sub-blocks and this structure remains the same for all keypoints even when the scales of the keypoints are different. Therefore, while the frequency of an image signal changes with successive application of blurring/smoothing filters in the same octave, the keypoints identified at different scales may be sampled with the same number of samples irrespective of the change in the frequency of the image signal, which is represented by the scale.

To characterize a keypoint orientation, a vector of gradient orientations may be generated (in SIFT) in the neighborhood of the keypoint 408 (e.g., by using a scale space image at the closest scale to the keypoint's scale). However, keypoint orientation may also be represented by a gradient orientation histogram (see FIG. 5) by using, for example, Compressed Histogram of Gradients (CHoG). The contribution of each neighboring pixel may be weighted by the gradient magnitude and a Gaussian window. Peaks in the histogram correspond to dominant orientations. All the properties of the keypoint may be measured relative to the keypoint orientation, this provides invariance to rotation.

In one example, a distribution of Gaussian-weighted gradients may be computed for each block where each block is 2 sub-blocks by 2 sub-blocks for a total of 4 sub-blocks. To compute the distribution of the Gaussian-weighted gradients, an orientation histogram with several bins is formed with each bin covering a part of the area around the keypoint. For example, the orientation histogram may have 36 bins, each bin covering 10 degrees of the 360 degree range of orientations. Alternatively, the histogram may have 8 bins each covering 45 degrees of the 360 degree range. It should be clear that the histogram coding techniques described herein may be applicable to histograms of any number of bins. Note that other techniques may also be used that ultimately generate a histogram.

Gradient distributions and orientation histograms may be obtained in various ways. For example, a two-dimensional gradient distribution (dx, dy) (e.g., block 506) is converted to a one-dimensional distribution (e.g., histogram 514). The keypoint 408 is located at a center of a patch 506 (also called a cell or region) that surrounds the keypoint 408. The gradients that are pre-computed for each level of the pyramid are shown as small arrows at each sample location 508. As shown, 4×4 regions of samples 508 form a sub-block 510 and 2×2 regions of sub-blocks form the block 506. The block 506 may also be referred to as a descriptor window. The Gaussian weighting function is shown with the circle 502 and is used to assign a weight to the magnitude of each sample point 408. The weight in the circular window 502 falls off smoothly. The purpose of the Gaussian window 502 is to avoid sudden changes in the descriptor with small changes in position of the window and to give less emphasis to gradients that are far from the center of the descriptor. A 2×2=4 array of orientation histograms 512 is obtained from the 2×2 sub-blocks with 8 orientations in each bin of the histogram resulting in a (2×2)×8=32 dimensional feature descriptor vector. For example, orientation histograms 513 and 515 may correspond to the gradient distribution for sub-block 510. However, using a 4×4 array of histograms with 8 orientations in each histogram (8-bin histograms), resulting in a (4×4)×8=128 dimensional feature descriptor vector for each keypoint may yield a better result. Note that other types of quantization bin constellations (e.g., with different Voronoi cell structures) may also be used to obtain gradient distributions.

As used herein, a histogram is a mapping k, that counts the number of observations, sample, or occurrences (e.g., gradients) that fall into various disjoint categories known as bins. The graph of a histogram is merely one way to represent a histogram. Thus, if k is the total number of observations, samples, or occurrences and m is the total number of bins, the frequencies in histogram k, satisfy the following condition:

$$n = \sum_{i=1}^{m} k_i,$$ (Equation 3)

where Σ is the summation operator.

The histograms from the sub-blocks may be concatenated to obtain a feature descriptor vector for the keypoint. If the gradients in 8-bin histograms from 16 sub-blocks are used, a 128 dimensional feature descriptor vector may result.

In this manner, a descriptor may be obtained for each keypoint identified, where such descriptor may be characterized by a location (x, y), an orientation, and a descriptor of the distributions of the Gaussian-weighted gradients. Note that an image may be characterized by one or more keypoint descriptors (also referred to as image descriptors). Additionally, a descriptor may also include a location information (e.g., coordinates for the keypoint), a scale (e.g., Gaussian scale at with the keypoint was detected), and other information such as a cluster identifier, etc.

Figure 6:
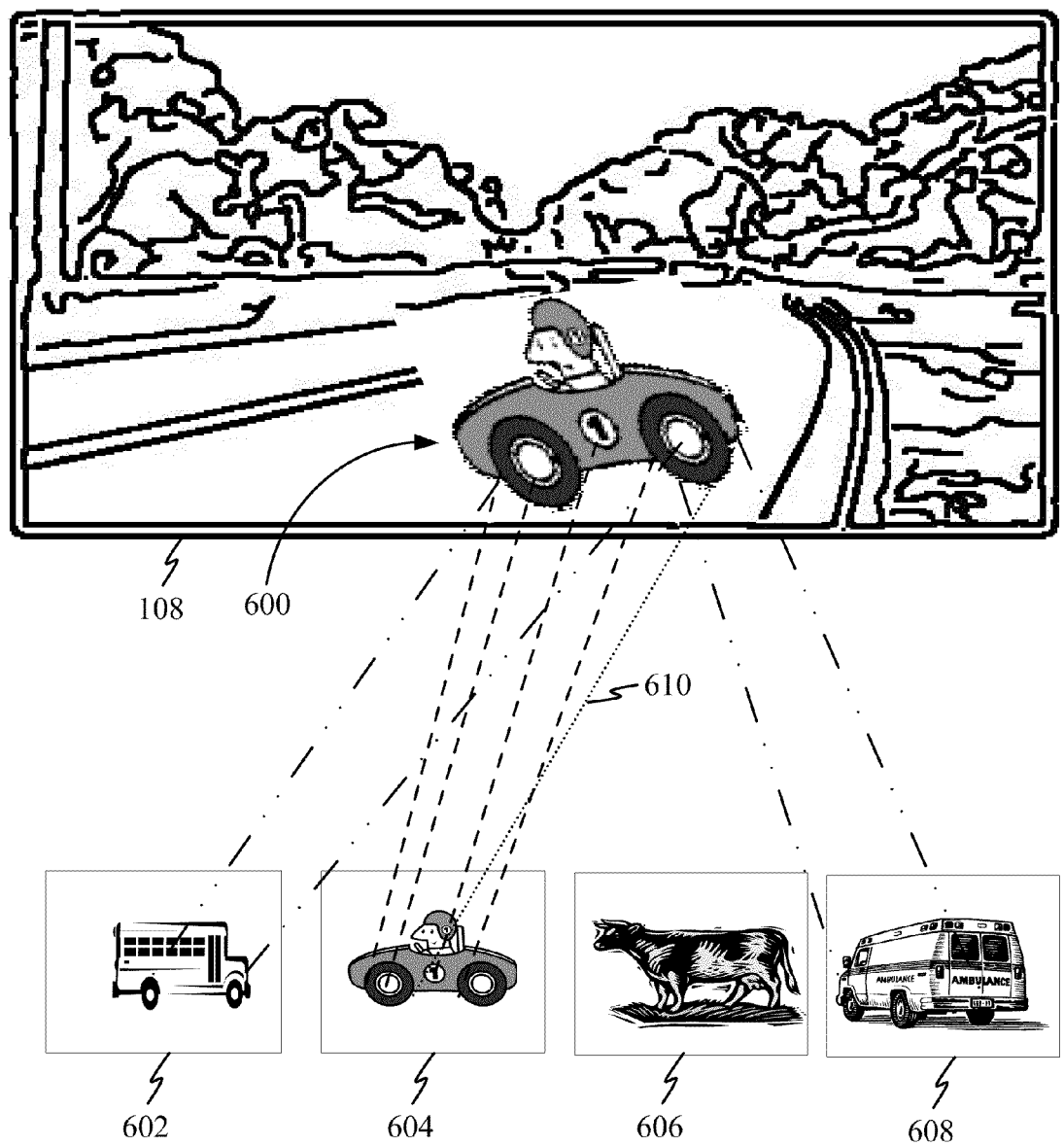
FIG. 6 illustrates feature matching in the exemplary image comparison stage.

FIG. 6 illustrates feature matching in the exemplary image comparison stage 106. Once descriptors have been obtained for keypoints identified in a query image, a keypoint in the queried image 108 may be compared and/or matched to points in target images 602, 604, 606, and/or 608 to perform feature matching 122. For instance, the descriptor for the keypoint in the queried image may be compared to one or more descriptors stored in a database of target images (corresponding to keypoints in the database of target images) to find one or more matches. Descriptor matching may involve a nearest neighbor search where the query descriptor is compared to a library of candidate descriptors in a database to determine the nearest or closest match. In several prior art approaches, matching query descriptors to candidate descriptors in a database may involve setting one or more thresholds to avoid false positives. For instance, a distance L2 between two descriptor may be used to validate a nearest neighbor match (i.e., shortest distance is selected as a match). This matching technique is susceptible to descriptors for repeating structures in an image. Therefore, a distance ratio (d1/d2) between a first match and the nearest second match for a query descriptor may be used to filter out non-unique feature (e.g., repeating structures). In this manner, keypoints in a query image are matched to keypoints in a target image. However, even the additional of the distance ratio test is susceptible to rejecting potential matches merely because the feature is repeating in the image, and false matches from having a plurality of keypoints located in close spatial proximity to one another.

Additionally, due to variations in pose or illumination or other factors (e.g., environmental conditions, etc.), feature matching (e.g., nearest neighbor search) can lead to errors since descriptors themselves can also change significantly. Consequently, such feature matching is known to have problems with excessive wrong matches (referred to as false positives). Partial feature matching (shown by dashed lines) is illustrated here for an object 600 in the queried image 108, where keypoints for the object 600 have been matched to a plurality of keypoints on a plurality of different target images 602, 604, 606, and/or 608. Some keypoints have been matched to incorrect images 602 and 608. Some of those same keypoints and other keypoints may have been matched to the correct image 604. Even when matched to the correct image 604, some keypoints in the queried image may be matched to incorrect points (i.e., locations) of the correct image 604 (like incorrect match 610). For instance, a descriptor for a keypoint for object 600 may be incorrectly matched to a descriptor for correct image 604. For this reason, geometric consistency checking 124 is performed as a post processing step.

Geometric consistency checking 124 (also referred to as geometric verification) is performed to ascertain or verify which of the matched keypoints (in the feature matching step) is actually a correct match. This geometric verification often applies data fitting models to a plurality of keypoints from the queried image. For example, RANdom SAmple Consensus (RANSAC) is a data fitting model for contaminated data and works by randomly sampling a set of points from data to estimate model parameters and verifies against all the data to determine the fitting. This is an iterative process to verify a correct match.

Geometric verification is a major computational bottle neck in the pipeline of object recognition. Successful verification of keypoint matches are referred to as "inliers" and unsuccessful verification of keypoint matches are referred to as "outliers". Inlier matches allows solving for location and/ or pose of an object in an image. Once a greater number of inliers than outliers are identified, a data fitting model (e.g., RANSAC) can be selected and used to implement geometric verification techniques. Seeking high precision in outlier rejection while not reducing inliers (high recall) tends to improve feature matching but also slows the object recognition process. This is because in the process of seeking to accept all possible inlier matches, the data (keypoints from query image) is highly contaminated by accepting many keypoints that result in wrong matches (outliers). The data fitting models (e.g., RANSAC) tend to slows down exponentially as more outliers are included. Conversely, by being more selective at the feature matching step (e.g., increasing threshold for what is considered a "match"), not only are outlier matches reduced but inlier matches are also reduced. To find a compromising threshold to get enough inliers while reducing outliers for faster convergence the geometric verification step for various datasets is typically not possible. As already noted, the conventional approaches (e.g., nearest neighbor L2 distance and/or ratio of nearest neighbor/second nearest neighbor d1/d2) suffer from known problems with objects that have spatially repeating features or when certain features appear in tight spatial clusters (leading to building descriptors on overlapping patches). That is, spatially repeating features often lead to incorrect keypoint matches.

Improving Performance of Geometric Verification by Using Anchor Points, Clustering, an Binary Keypoint Matching Geometric verification is employed as a post-processing step to exclude false positive keypoint matches (i.e., outliers). In performing geometric verification (also referred to as consistency checking), a best hypothetical transformation between a query and a candidate target image is estimated, keypoint matches which are not consistent with this transformation are removed as false positives (i.e., outliers). However, geometric verification is computationally expensive.

According to one approach for eliminating geometric verification or improving the convergence rate of geometric verification includes imposing constraints on keypoint matches in parallel with the feature matching process. That is, rather than applying geometric verification after feature matching, false positive matches may be reduced, prevented, and/or eliminated during the feature matching step itself. This approach increases the inlier-to-outlier ratio so that the convergence rate of geometric verification techniques is not slowed.

Figure 7:
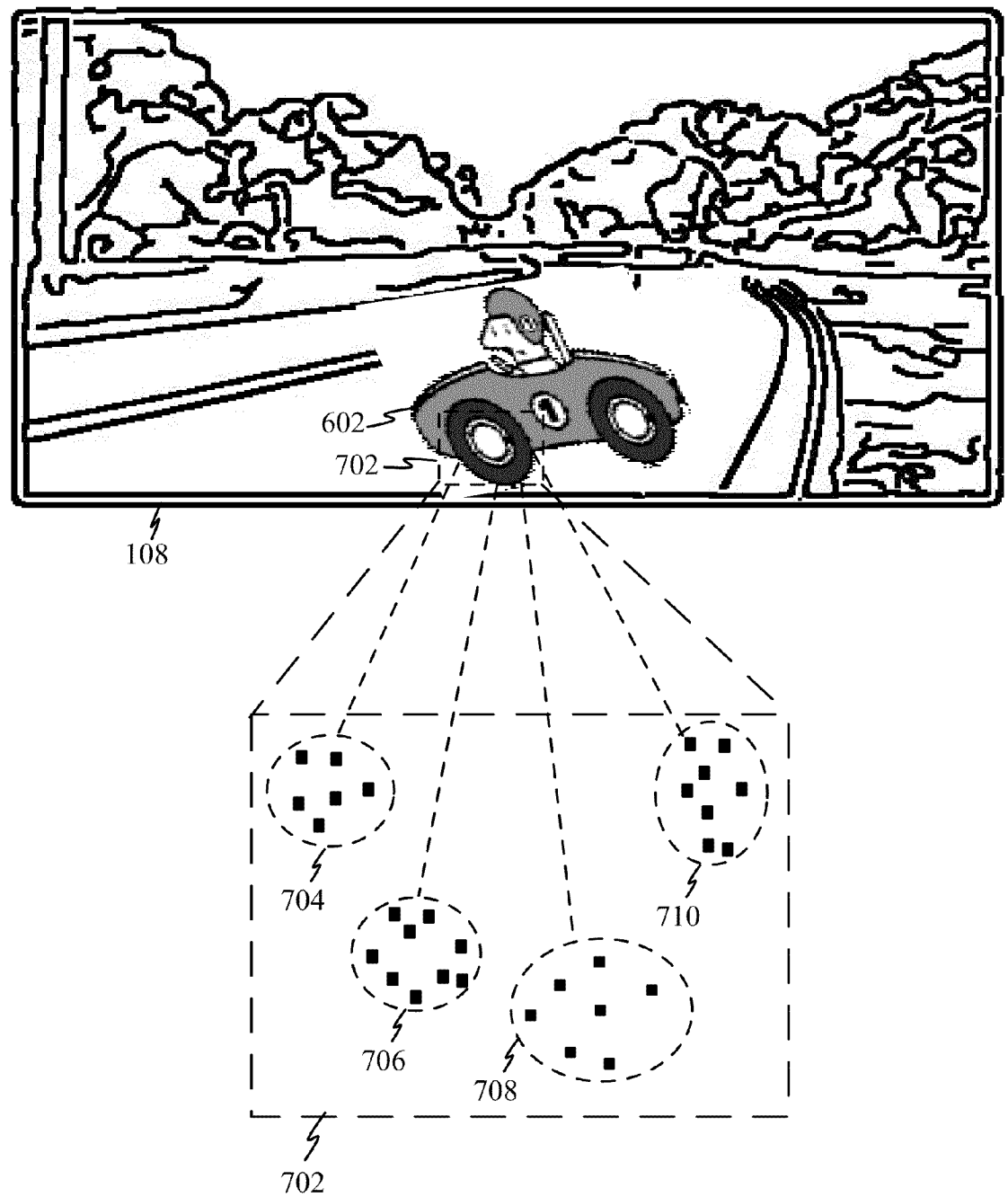
FIG. 7 illustrates keypoint clusters within a queried image.

It has been observed that keypoints in an image often occur in groupings or clusters. Thus, in a queried image there will be natural clusters (i.e., local grouping) of keypoints present. FIG. 7 illustrates keypoint clusters within a queried image. In this example, four keypoint clusters 704, 706, 708, and 710 have been identified, each of these clusters including a plurality of keypoints for a region 702 of the queried image 108. It has also been observed that each cluster has roughly the same keypoint pose or geometry (e.g., scale and orientation of all keypoints are roughly the same). Another observation is that some clusters will have higher counts of inliers as compared to others. Additionally, clusters are typically preserved across viewpoints (e.g., angle of view for a query image in comparison to a target image) although the size and shape may vary.

According to one feature, inlier-to-outlier ratios can be increased by grouping identified keypoints into clusters, selecting anchor points from the keypoints, and establishing anchor point correspondence with target images, and impose binary decision for keypoint matches within the clusters.

Figure 8A:
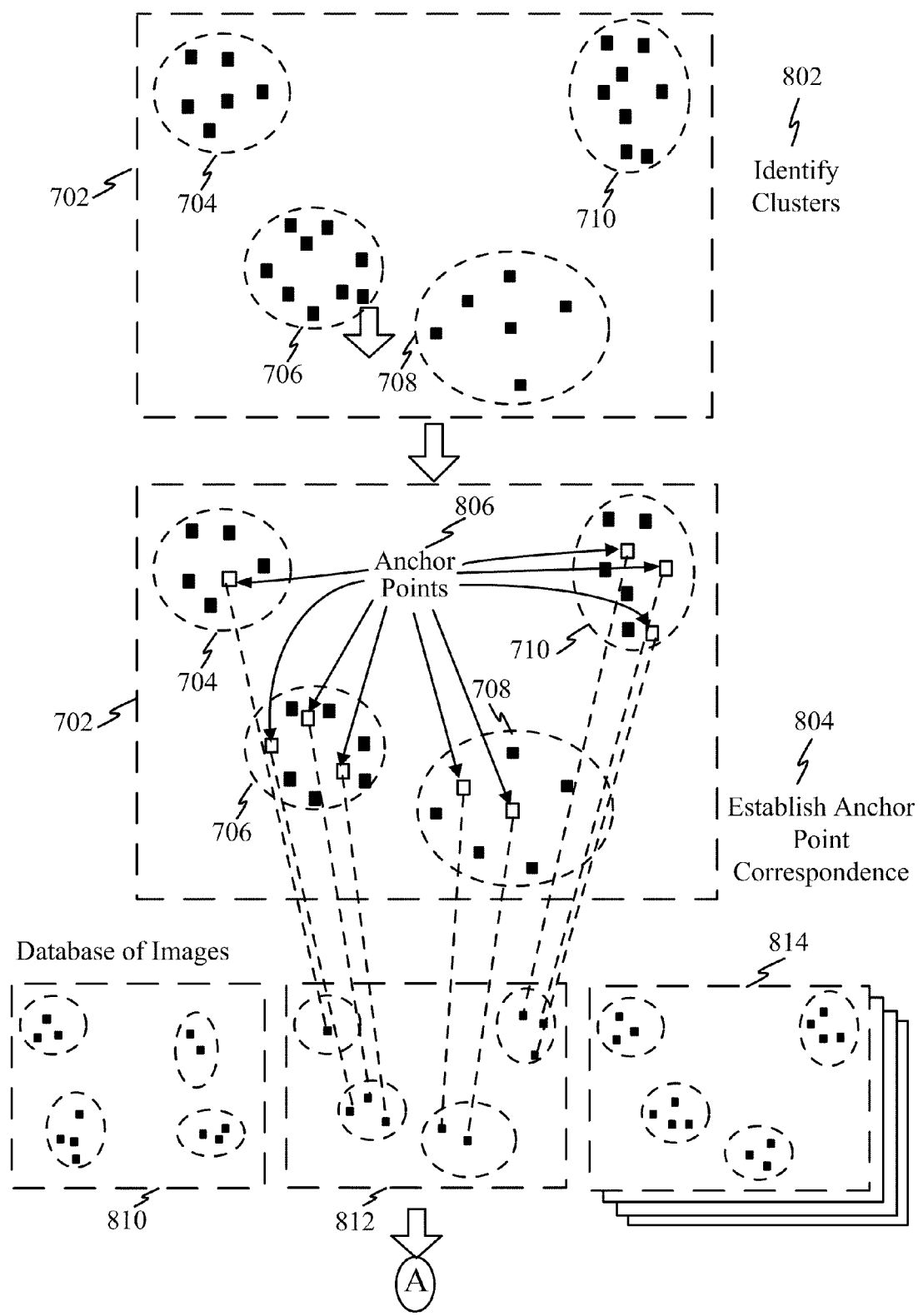
FIG. 8 (comprising FIGS. 8A and 8B) illustrates how an inlier-to-outlier ratio may be improved by using keypoint clusters.
Figure 8B:
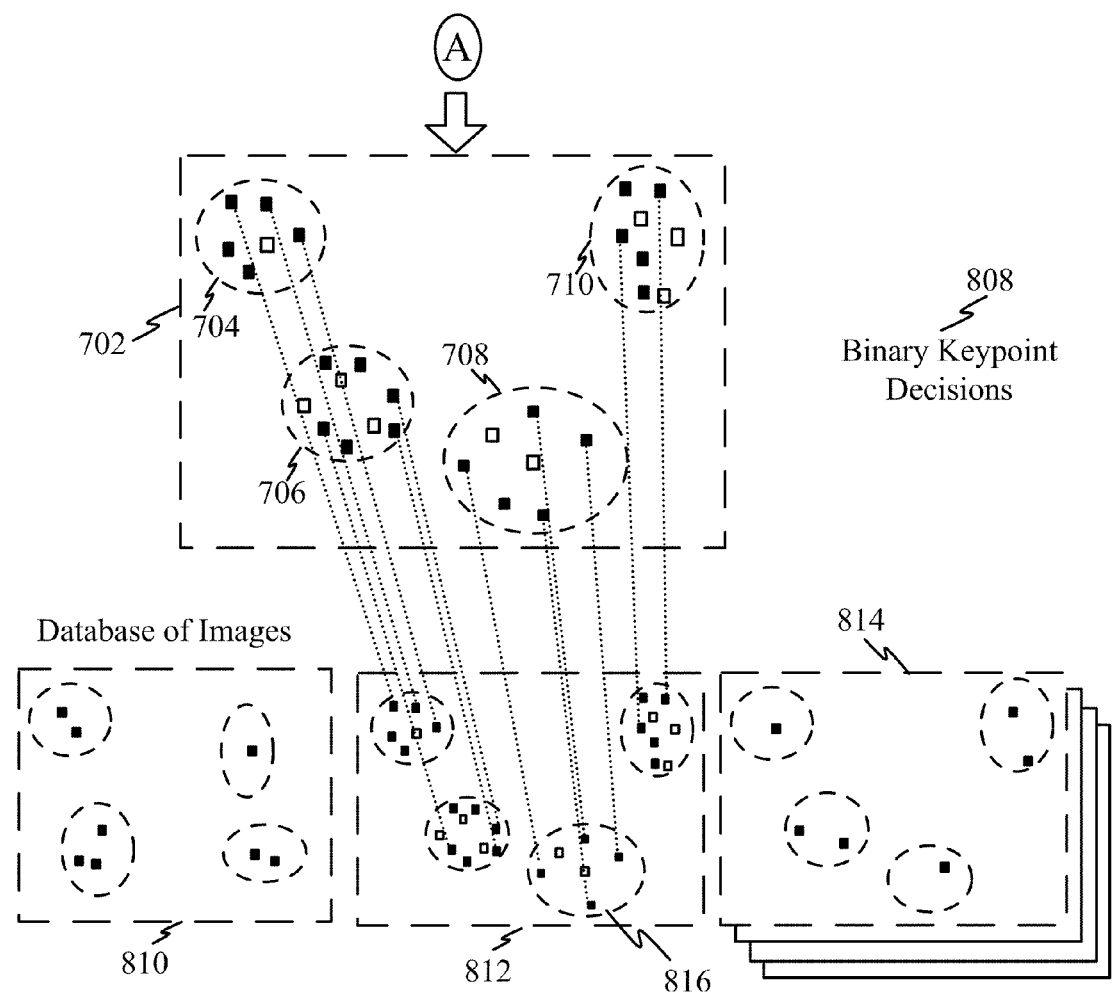

FIG. 8 (comprising FIGS. 8A and 8B) illustrates how an inlier-to-outlier ratio may be improved by using keypoint clusters.

Identify Clusters 802: Once a plurality of keypoints have been identified for an image, one or more keypoint clusters 704, 706, 708, and 710 may be identified within a region 702 of that image. Local keypoint clusters may be estimated on query image and target image(s) using, for example, a non-parametric density estimation process, mean shift analysis. This may be done on-the-fly for a query image and offline for target images. Having identified keypoints, clusters are built around keypoints based on a density analysis, but not around each pixel of the images.

Establishing Anchor Point Correspondence 804: Within each cluster, one or more keypoints (but not necessarily all keypoints in the cluster) may be selected as anchor points 805. Anchor points may be selected from the keypoints in clusters 704, 706, 708, and 710 based on their robustness or recognition across different scale spaces. That is, keypoints that are detectable across a plurality of scales may be selected as anchor points 806. Identification of anchor points may be done by iteratively comparing each keypoint in a cluster with keypoints from one or more target images in a database. That is, the descriptors associated with such keypoints may be compared to determine if there is a match. Keypoints for which strong matches (e.g., above a high predetermined threshold and/or occurring in a high scale space) are found may be considered anchor points. The decision of whether an anchor point match or "correspondence" occurs may be based on a descriptor distance threshold and/or the level of the scale space in which the keypoint is recognized. Hence, anchor points have a high degree of correspondence between the query image and a target image. Anchor point matches may also take into account that some clusters are more reliable (robust against deformation) and have more inliers than other clusters. In this example, anchor points in the query clusters 704, 706, 708, and 710 have been matched with anchor points in a first target image 812.

During this process of establishing anchor points, the keypoints in a query cluster are attempted to be matched with keypoints in one or more target images. Some keypoints in the query cluster will not be sufficiently close to keypoints in the target image for a match to be found. For instance, even though a query keypoint in a query cluster may have a corresponding keypoint in a target cluster, they may not be sufficiently close (e.g., in distance) for a "match" to be found. However, information about these attempted/failed keypoint matches may be saved for subsequent use (i.e., for performing binary keypoint decisions 808). Such information may include, for example, whether there is a corresponding keypoint in the target cluster.

Binary Keypoint Decisions 808: For each cluster for which anchor point correspondence is established, a binary decision may be made for additional keypoints in a cluster 704, 706, 708, and 710. This binary decision merely determines whether a keypoint in the cluster for a query image has a match in a corresponding target image. Because an attempt to match all keypoints in a query cluster to one or more keypoints in target images has already occurred for establishing anchor points, this keypoint matching process need not be repeated. Instead, information from the previous match attempt may be used in making this binary keypoint matching decision. So long as a corresponding keypoint was found in a target image and such keypoint is within the same corresponding cluster as the anchor points for the query cluster, then a binary match is found. For example, cluster 708 may have been matched (via their anchor point(s)) to cluster 816 in target image 812. Therefore, keypoints in the query cluster 708 are automatically "matched" if they have a corresponding keypoint in the corresponding target cluster 816. This leads to a very high inliers/outliers ratio with more density of matches within local clusters. Note that all the information to perform this binary keypoint matches was already obtained when establishing anchor points, so not additional keypoint comparisons are needed.

Figure 9:
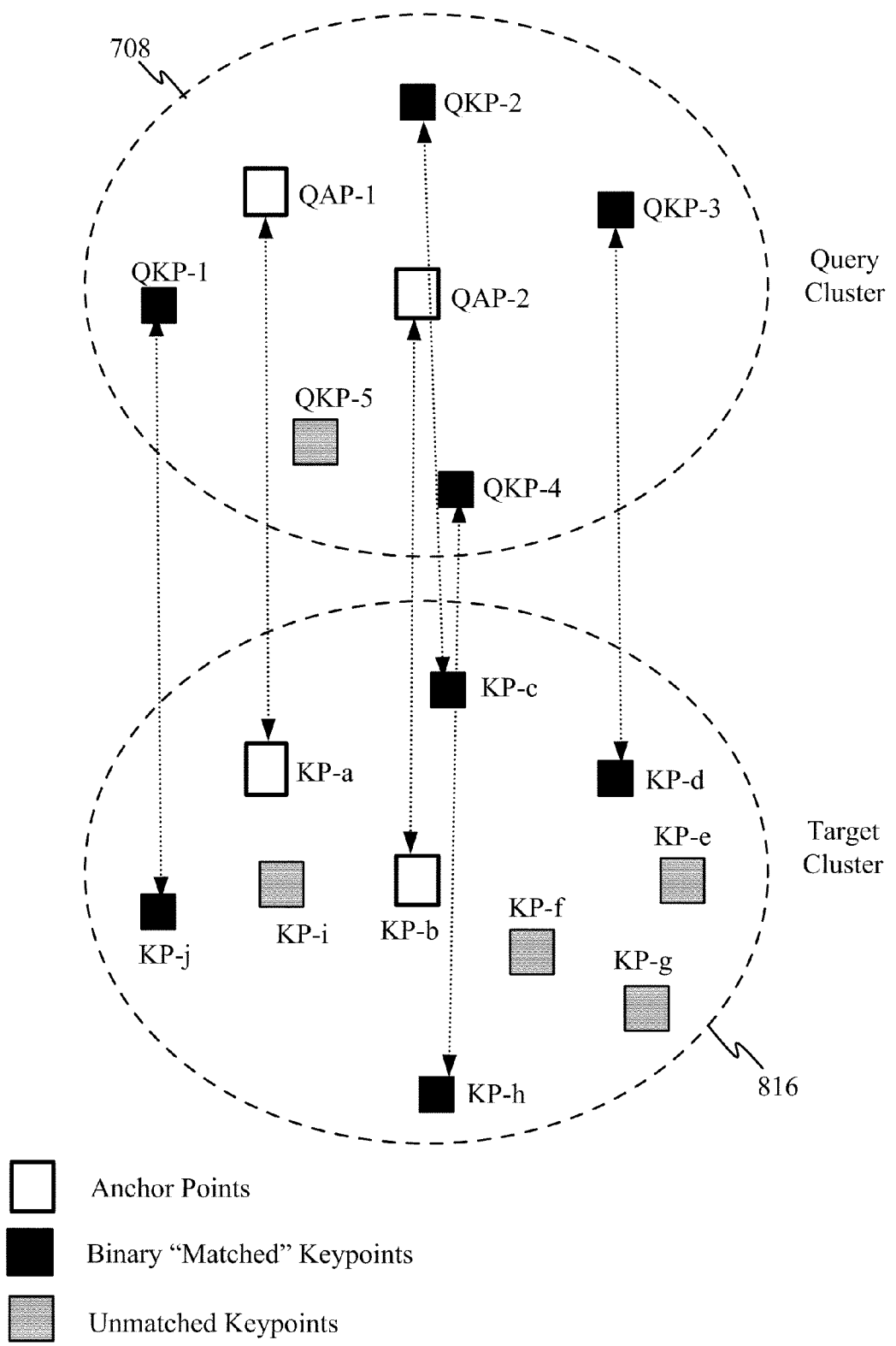
FIG. 9 illustrates an example of keypoint matching between a query cluster and a target cluster according to the method of FIG. 8.

FIG. 9 illustrates an example of keypoint matching between a query cluster and a target cluster according to the method of FIG. 8. In order to ascertain anchor points in the query cluster, each keypoint in the query cluster 708 may be compared (e.g., using its corresponding descriptor) to keypoints in one or more target images from a database. Strong matches (e.g., those keypoint matches meeting a high threshold) are selected as anchor points. In this example, keypoints QAP-1 and QAP-2 have been identified as anchor points for the query cluster 708. Note that, if anchor points in the query cluster 708 are associated with more than one target cluster, then the target cluster with the highest number of corresponding anchor points is selected as a corresponding cluster. Here, target cluster 816 has been found to be the corresponding cluster for the query cluster 708. Having identified cluster correspondence (between the query cluster 708 and target cluster 816), binary keypoint matching may be performed on the remaining keypoints in the query cluster 708. Here, query keypoints QKP-1, QKP-2, QKP-3, and QKP-4 may have been previously rejected as anchor points because, even though they had corresponding keypoints in the target cluster, this correspondence did not meet the high threshold for an anchor point match. Since this correspondence process has identified that some of these query keypoints had corresponding keypoints and the target cluster for these corresponding keypoints, this information may be used to perform binary keypoint matching. If a query keypoint had a corresponding keypoint in the same target cluster that was selected based on the anchor point matches, then all those keypoints are included as part of the query cluster for image recognition purposes. Here, query keypoints QKP-1, QKP-2, QKP-3, and QKP-4 have been associated with corresponding keypoints KP-j, KP-c, KP-d, and KP-h, respectively, in the target cluster 816. Note that the keypoint QKP-5 is unmatched, which means that it may have been incorrectly matched or associated with a keypoint in a different target cluster or no keypoint match was found for it.

Since spatial constraints have been established (i.e., a cluster has been defined), outlier matches typically do not occur. That is, a keypoint is not merely matched to other keypoints in a target image, but rather to keypoints within a corresponding cluster (as identified by anchor point matches). Additionally, since this is a binary decision (not a threshold/probabilistic decision as in anchor point matching), all possible inliers are accepted even if there are spatially repeating structures.

Exemplary Keypoint Matching Using Clustering

Figure 10:
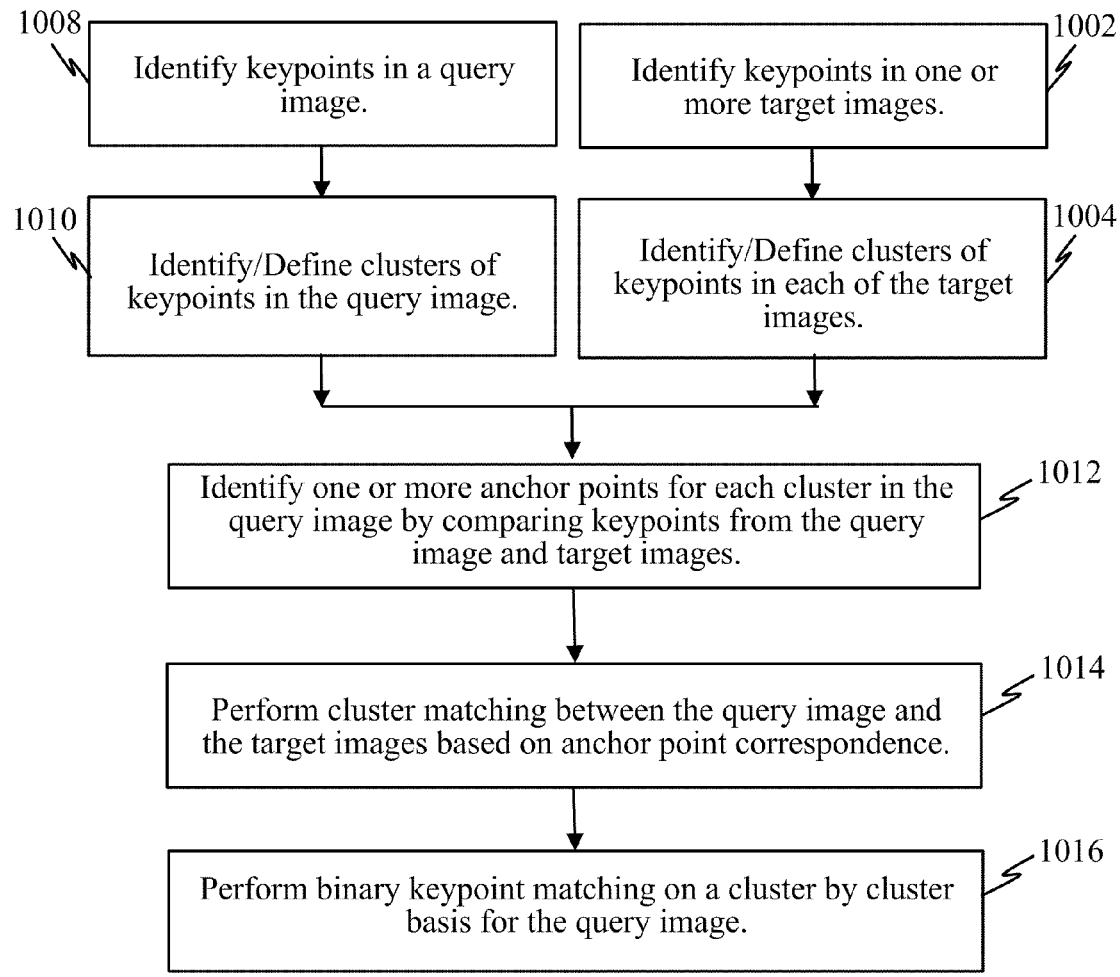
FIG. 10 is a flow chart illustrating a method for performing keypoint matching using clustering.

FIG. 10 is a flow chart illustrating a method for performing keypoint matching using clustering. Initially, target images may be processed offline in order to build a database of reference images. For instance, keypoints may be identified in one or more target images 1002. Clusters of keypoints may be identified or defined for each of the target images 1004. Similarly, for real-time processing of a queried image, keypoints are identified 1008, and clusters of keypoints are defined 1010. Note that the clustering process described here is not based on clustering every pixel in an image but only on those pixels which have been categorized as keypoints.

The computational complexity is further reduced by considering only a subset of the total keypoints (i.e., only anchor points) to employ initial clustering. One or more anchor points may be identified for each cluster in the query image by comparing keypoints from the query image and target images 1012. For instance, the one or more anchor points may be selected based on a high correspondence threshold between a keypoint in the query image and a keypoint in the target images. This anchor point selection process may be done by comparing the descriptor for each keypoint in the query image to descriptors for keypoints in the target images.

Next, cluster matching may be performed between the query image and the target images based on anchor point correspondence 1014. That is, based on the anchor points that have been matched in the query cluster, a corresponding cluster is selected in the target images. For instance, the corresponding cluster in the target images may be the cluster to which the largest number of anchor points was matched from the cluster of the query image. Then, binary keypoint matching may be performed on a cluster by cluster basis for the query image 1016. That is, having already performed keypoint comparisons, information about the nearest corresponding keypoint in a cluster for a target image may be obtained. Keypoints that had a partial match (i.e., a match below the high threshold) within the target cluster are kept in the query cluster. Unmatched keypoints and/or wrongly matched keypoints are excluded from the query cluster.

The steps 1004/1010 of identifying clusters (such as 802 in FIG. 8) may be performed in a number of ways. Given a plurality of keypoints, clusters of these keypoints may be obtained non-parametrically (i.e. without constraints on the prior number of clusters). The parameter for clustering may be spatial proximity. The proximity scale may be set by the kernel size used for clustering. Color and texture may also be used in addition to spatial proximity for clustering. In one example of clustering, n keypoints may be grouped into separate clusters or groups using a non-parametric kernel density estimator. For a set of keypoints $\{x_1, \ldots x_n\}$, where $x_i \in R^2$ is the coordinate for the i-th keypoint, the non-parametric kernel density estimator for this set may be defined as:

$$k(x) = \frac{1}{n}\sum_{i=1}^{n} k_h(x, x_i), \qquad \text{(Equation 4)}$$

where $k_h(x, x_i)$ is a kernel with bandwidth h. The bandwidth specifies the resolution of the density and hence the neighborhood of points affecting the local density estimate around x. For instance, for a Gaussian kernel the bandwidth h corresponds to the standard deviation $$k_h(x, x_i) = c_h g_h(x, x_i) = c_h \exp\left(-\frac{\|x - x_i\|^2}{2h^2}\right) \qquad \text{(Equation 5)}$$

where $c_h$ is a normalizing constant, and $g(x, x_i)$ is the unnormalized Gaussian kernel. If the kernel is convex and monotonically increasing, the mean-shift algorithm is guaranteed to converge to local maxima. This may be done iteratively following the mean shift which is proportional with the gradient ascent direction of the density function. For a Gaussian kernel, the mean shift may be given by:

$$y_{j+1} = \frac{\sum_{i=1}^{n} x_i g_h(y_j, x_i)}{\sum_{i=1}^{n} g_h(y_j, x_i)}, \qquad \text{(Equation 6)}$$

where $y_{j+i}$ is the shifted location from $y_j$ under the estimated density function. Because the shift is weighted inversely with the probability of the current location, it rapidly converges on the local maxima. All keypoints which converge to the same local maxima may be considered a cluster.

Given a query image $I_Q$, a set of scale invariant features (referred to as keypoints) $F(I_{Qj})=\{(x_{Qj}, y_{Qj}, s_{Qj})\}$ may be extracted such that they are centered at coordinates $(x_{Qj}, y_{Qj})$, with scale $s_{Qj}$. A set of spatial clusters $KQ_k$, $k=\{1 \ldots n_c\}$ is defined, where $n_c$ is the number of clusters obtained by employing mean shift clustering with circular kernel of radius K on $F(I_{Qj})$. Thus, the set of spatial clusters (of keypoints) may be defined as:

$$KQ_k=\{(f_{Qj}\epsilon F(I_{Qj}),\{f_j\epsilon F(I_{Qj})|cl(K)\} \qquad \text{(Equation 7)}$$

where cl(K) denotes clustering using kernel K.

In an offline training phase, database images $I_T$ may be similarly processed to obtain keypoint clusters, but with a plurality of different kernel sizes. The feature (keypoint) set here is defined as $F(I_{Tj})$. The total cluster set is defined as $KT_l$, where the subscript "l" denotes the index of the cluster in the entire cluster set KT. The reason behind picking a kernel size for the query image $I_Q$ and kernel set (i.e., a plurality of kernel sizes) for the database images $I_T$ is that the database images $I_T$ are sampled at a plurality of different scales, permitting feature matching at different image scales.

For each cluster (k, $KQ_k$) in the query image $I_Q$, a point correspondence set C may be obtained by using a distance ratio (or distance L2) threshold between successive image patches. This correspondence set C is the initial anchor point set (i.e., set of anchor points). Recall that keypoints (including anchor points) are represented by descriptors. For example, features (e.g., keypoints and/or neighboring points) $F(I_{Qj})$ in the query image $I_Q$ may be represented by descriptors $D(I_Q)$. Similarly, features (i.e., keypoints) $F(I_{Tj})$ in the database images $I_{Tj}$ may be represented by descriptors $D(I_T)$. The correspondence set C includes those anchor points $f_d^1$ in a single query cluster (for query image $I_Q$) that are successfully matched with anchor points $f_d^2$ in clusters in a database of images. Thus, the set of anchor point correspondence C for one cluster is defined as:

$$C=\{(f_d^1, f_d^2), \text{ where } f_d^1 \epsilon D(I_Q) \wedge f_d^2 \epsilon D(I_T)\} \qquad \text{(Equation 8)}$$

where the operator $\wedge$ is a logical conjunction operator (i.e., True if an anchor point is in both descriptor groups, False otherwise). The anchor point correspondence set C has few or no outliers but also has very few inliers. In this manner, a set of anchor points (i.e., defined by the anchor point correspondence set C) may be obtained for one cluster.

Figure 11A:
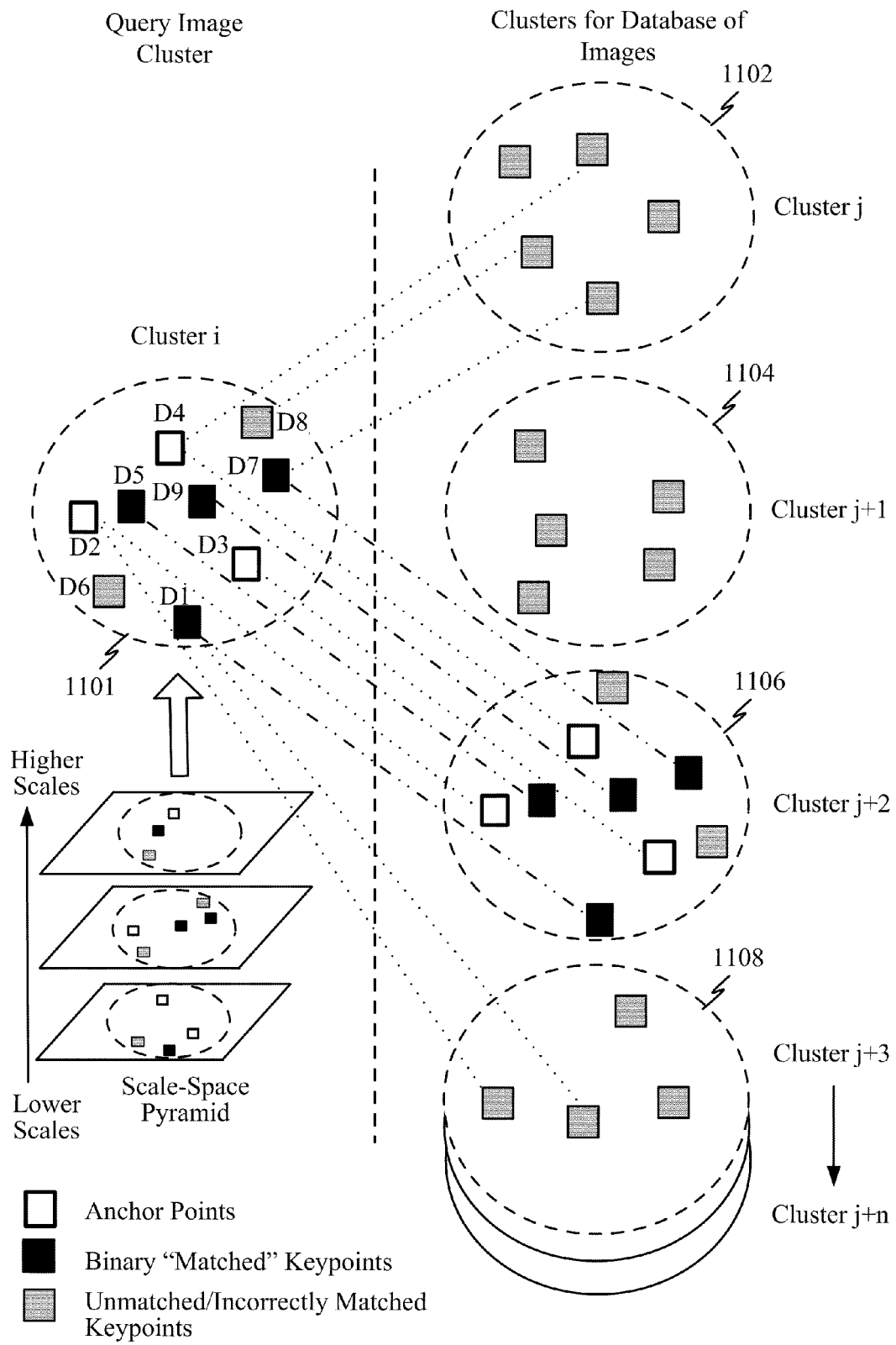
FIG. 11 (comprising FIGS. 11A and 11B) illustrates an example of anchor point matching, cluster correspondence, and binary keypoint matching.
Figure 11B:
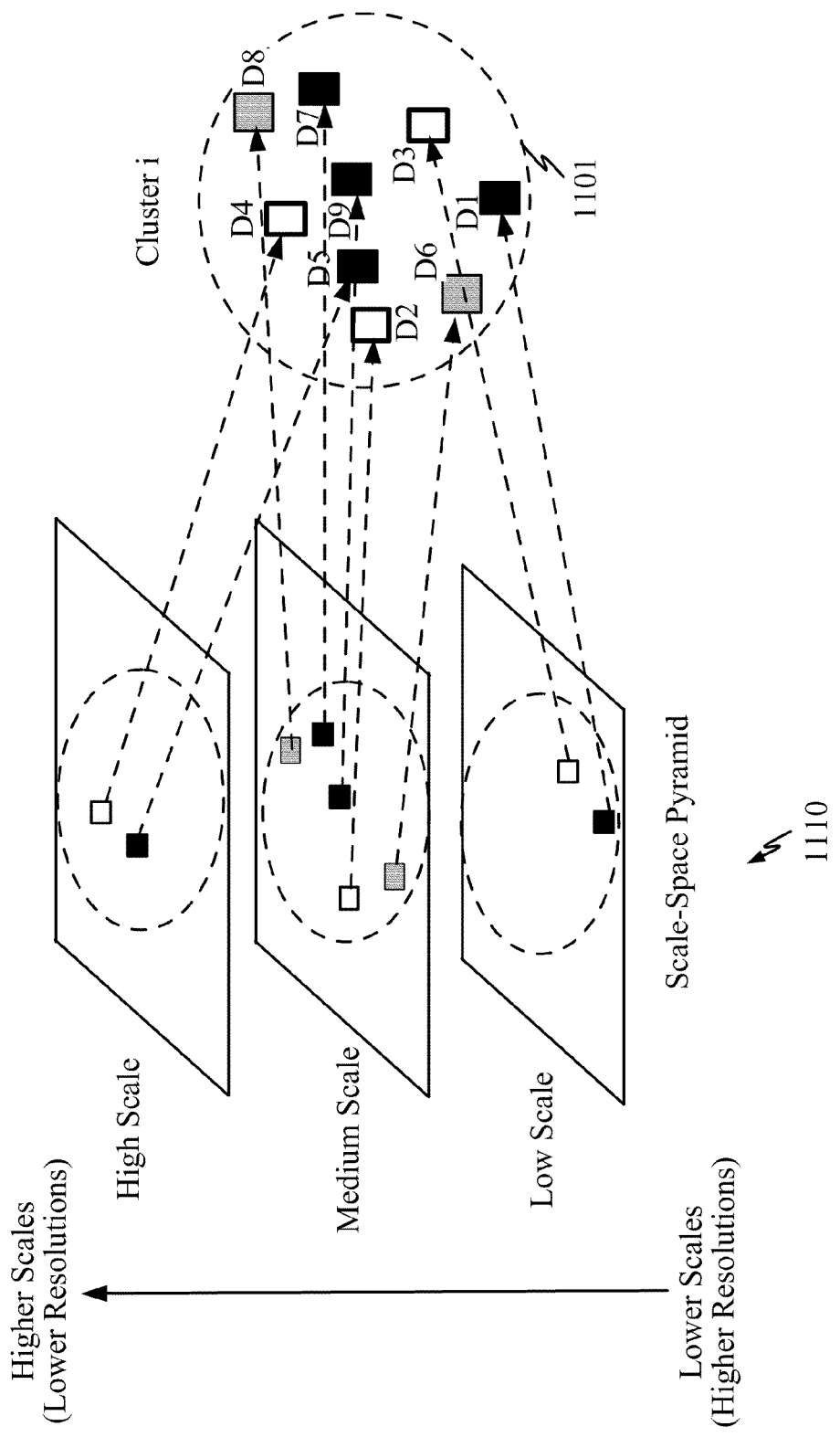

FIG. 11 (comprising FIGS. 11A and 11B) illustrates an example of anchor point matching, cluster correspondence, and binary keypoint matching. FIG. 12 is a table illustrating that further details the results of FIG. 11. A plurality of keypoints (associated with descriptors D1-D9) for a query cluster i 1001 are compared to keypoints for one or more target images in an attempt to find anchor point matches. In determining anchor point matches, a high threshold is used. Keypoint matches that satisfy the threshold (i.e., the keypoint correspondence is equal to or above the threshold), then an anchor point match is made (referred to as "full match"). Otherwise, if a query keypoint is unmatched or the keypoint correspondence is less than the threshold (referred to as "partial match"), then no anchor point match is made. This matching information (including corresponding target image cluster(s)) is maintained, saved, or stored for subsequent use. In this example, keypoints associated with descriptors D2, D3, and D4 have satisfied the correspondence threshold (i.e., are full matches). D2 has been matched with keypoints in clusters j+2 and j+3. D3 has been matched with a keypoint in cluster j+2. D4 has been matched with keypoints in clusters j and j+2. Because the greatest number of full matches for anchor points is with cluster j+2, cluster correspondence between the query cluster i 1101 and target cluster j+2 1106 is established. Therefore, an anchor point correspondence set $C_i$ may include the anchor points corresponding to descriptors D2, D3 and D4 for cluster i 1101. Subsequently, to increase inlier keypoint counts and reduce outlier keypoint counts, other query keypoints for which a partial match was found in the selected target cluster j+2 1106 are included as keypoints. This is a binary decision where, so long as a query keypoint had a partial match in the selected target cluster, then it is included as part of the query cluster. In this example, query keypoints associated with descriptors D1, D5, D7, and D9 are brought in a keypoints for the query cluster i 1101. All other keypoints, such as those associated with descriptors D6 and D8, are discarded or ignored for purposes of image matching.

In one example, an anchor point match ("full match") may be based on an L2 distance rather than a distance ratio. That is, a threshold for the L2 distance (e.g., a maximum error difference for a keypoint match) is selected such that all outlier matches are rejected even at the cost of rejecting most (but not all) inlier matches.

The matching process may also be based on a scale space priority, where keypoints detected at higher scales are preferred or favored over keypoints detected at lower scales. Here, a scale space pyramid 1110 is illustrated showing the different scales at which the various keypoints are detected. It has been observed that keypoints detected at higher scales in a scale space pyramid are more stable as compared to keypoints detected at lower scales. This is because high scale features (i.e., features detected at higher octaves of a scale space pyramid) are smoother and more robust to noise and deformations. In one example, only keypoints that fall in either a high scale and/or a medium scale of the scale space pyramid 1110 may be considered as an anchor point.

Therefore, in one example, a nearest neighbor in the target image may be accepted as an anchor point only if the L2 distance is less than a threshold Tc and if the query keypoint satisfies a preset scale space priority (e.g., query keypoint is found at the n highest scale(s) of the scale space pyramid). In this manner, the resulting matches are considered anchor point matches.

Note that even where spatially repeating features are present in the query image, the spatial constraint imposed by the anchor points and cluster correspondence tends to reduce incorrect keypoint matches, thereby improving inlier-to-outlier ratios.

The repeatability and descriptive power of descriptors deteriorate with affine change and viewing angle. Therefore, in determining keypoint/feature matches, the viewing angle may also be taken into account. That is, where the query image has a widely different viewing angle than a target database image, there is a greater chance for matches to be wrong or inaccurate. Because it is desirable for the anchor point correspondence set C to be as accurate as possible, matches after a certain change in viewing angle may be penalized or avoided. The reference view is the frontal view of the scene or object. As the view point is changed, there is a correlation between, the L2 distance of the descriptors obtained from the reference and an angled view, and the viewing angle β. The L2 norm peaks after a certain angle β, which is selected as the threshold angle. Therefore, any matches beyond the threshold angle β may be considered unreliable. In implementations, the threshold angle β may be experimentally ascertained by determining the threshold angle β at which correct keypoint correspondence starts to drop off (i.e., the angle β at which L2 distance starts to peak).

Having obtained anchor point matches for cluster i 1101 (identified in correspondence set $C_i$), a cluster correspondence set $S_{kl}$ may be obtained which includes the matching anchor points. That is, once anchor points $f_i$ are matched for cluster i 1101, the query cluster may be matched to clusters in the database based on the anchor point matches. The cluster correspondence set $S_{kl}$ of anchor points may be defined as:

$$S_{kl}=\{f_i<\text{-}>f_j, \text{where } f_i\epsilon(k,KQ_k)\&f_j\epsilon(l,KT_l)\} \quad \text{(Equation 9)}$$

where <-> denotes correspondence between a query image anchor point $f_i$ and a target database image anchor point $f_j$.

An index Is for a target database cluster may be obtained from the entire cluster set $KT_l$ as:

$$Is=arg_{for\ all\ "l"}\cdot\max(\text{cardinality}(S_{kl})). \quad \text{(Equation 10)}$$

That is, the selected database cluster is the one for which the most anchor points in the query image cluster are matched. Note that there may be cases where two indexes (such as Is1 and Is2) may provide the same solution under Equation 10 (i.e., two or more indexes are found that identify a match to different clusters). If so, the index pointing to a target cluster with peak keypoint density is selected as this provides tighter matching with less outliers.

In this manner, cluster correspondence can be achieved which enforces spatial constraint in subsequent keypoint matching.

Cluster correspondence may be ascertained in various ways. In one example, if a sufficiently high percentage of anchor points in the query cluster are matched to a target cluster, then cluster correspondence is found. For example, if the ratio of the number of anchor points in cluster correspondence set $S_{kl}$ to the lowest or minimum of the number of anchor points in the query image clusters $KQ_k$ or lowest or minimum of the number of anchor points in the target cluster set $KT_l$ in the database is greater than a threshold $T_{cluster}$, then the index Is is considered meaningful. For instance, the index Is is considered meaningful if:

$$\frac{\text{cardinality}(S_{kl})}{\min[(\text{cardinality}(KQ_k), \text{cardinality}(KT_l)]} > T_{cluster}, \quad \text{(Equation 11)}$$

where the threshold $T_{cluster}$ may be a user-defined percentage or ratio. Equation 11 considers whether the fraction of correct anchor point matches obtained (in the cluster correspondence set $S_{kl}$) is significant enough (sufficiently high) to make a cluster correspondence. Equation 11 divides the number of anchor points in the cluster correspondence set $S_{kl}$ by the minimum number of anchor points in the query cluster or the database target cluster to account for cluster size variance due to occlusion and affine deformation. This leads to not accepting wrong cluster correspondence between the query cluster and the database (target) cluster. This exploits the observation that some clusters are more stable than others.

In some implementations, whether a cluster is considered meaningful may take into consideration that significant view point changes are going to change cluster sizes. Therefore, depending on the view point angle, the number of matches that are considered sufficient for cluster correspondence may vary. For example, if a maximum of 70 degrees viewpoint change is expected, the threshold for minimum matches fraction in Equation 11 can be modeled as $T_{cluster}=\arccos(70)$, which is approximately 0.35. This signifies that there may be a minimum number of anchor point matches in relation to the number of features in the query and target clusters to make correspondence admissible.

Referring again to FIG. 11, once cluster correspondence has been performed, keypoint matching may be performed for those keypoints not previously selected as anchor points. To generate a final correspondence set CN of all matching keypoints in a cluster, each keypoint $f_d^1$ in the query cluster is matched to a keypoint in the database image. The "match" is accepted only if the query keypoint falls within the target cluster identified by the index Is. The final correspondence set CN of matching keypoints in a cluster may be represented as:

$$CN=\{\{(f_d^1 \in D(KQ_k), f_d^2 \in D(S_{kl})), D(KQ_k) \wedge D(S_{kl})\}\}$$  (Equation 12)

Note that the set CN may be larger than the anchor point correspondence set C with a high number of inliers and very low outliers. It should be noted that when cluster correspondence is computed, the nearest neighbor distance for all points in a query image are computed and the database base cluster into which these nearest neighbors (NN) fall (both for accepted and rejected matches) is also stored along with their L2 distance. Subsequently, when keypoint matching per cluster is being performed, a check is performed for each keypoint to determine if the nearest neighbor of a query keypoint has fallen in the right cluster. Thus, there is no need to compute the nearest neighbor again for the query keypoints.

Additionally, by comparing each query cluster individually to database clusters (constructed using a family of kernel sizes), this takes into account that scale changes might not be uniform across an image due to affine transformation.

FIG. 13 is a block diagram illustrating the improvement of cluster by cluster matching over keypoint by keypoint matching. In keypoint to keypoint matching 1302, each keypoint a query image 1306 is individually compared to one or more keypoints in a database of images 1308, without regard to spatial constraints. In this example, descriptors D1, D2, D3, D4, D5, D6, D7, D8, and D9 for keypoints in the query image 1306 are matched to descriptors of keypoints in the data base of images. As illustrated here, descriptors D1-D9 are compared and/or matched in a sequential or random order (i.e., not spatially constrained) from D1 to D9.

By contrast, in the cluster by cluster matching approach 1304, keypoints are first grouped into spatially-constrained clusters 1310, 1312, 1314, and 1316. Then, only a subset of the total keypoints (i.e., anchor points) within each cluster need be matched in order to ascertain a cluster to cluster match. That is, having grouped the keypoints in the query image 1306 into clusters, comparisons/matches may be performed on a cluster by cluster basis. For example, keypoints in a first cluster 1310 can be compared to the keypoints in the database to ascertain keypoint matches. Once a sufficient number or percent of the keypoints have been matched, a cluster correspondence may be made between the first cluster 1310 and a cluster in the database of images 1308. Then, this process is repeated for a second cluster 1312, a third cluster 1314, and a fourth cluster 1316, on a cluster by cluster matching. Unlike the keypoint by keypoint matching approach 1302, with the cluster by cluster matching approach 1304 not all keypoints need be matched (or attempt to be matched). Instead, attempts to match may be done on a per cluster basis. Once a sufficient number/percent of the keypoints in a cluster have been matched, the remaining keypoints need not be matched. Instead, the matched keypoints may be used to actually match the query cluster to a target cluster in the database of images. Thus, a significant amount of keypoint processing is avoided by implementing spatially constrained keypoint matching.

Image Scaling—Adapting Kernel Size to Aid in Cluster Correspondence

Prior to performing keypoint matching between a query image to a target image, the scale of the query image needs to be estimated or roughly ascertained so that the keypoint comparison is performed at roughly the same scale for both the query image and the target image. Consider a query image at a slightly different viewpoint than a target image of the same scene or object, where there is a scale difference between the two images. For the same Gaussian kernel size 'R' (in the Gaussian pyramid), the clusters detected in the query image and the target image may be different because of the fact the kernel covers different sized portions of the images. A one-to-one cluster correspondence may not be established. Determining the scale of the query image allows selection of a kernel size 'R'. A 'scale' may refer to the resolution for a given image.

For any given image, there will be a distribution of the detected keypoints along a scale space pyramid (FIG. 3), such as a Gaussian pyramid. A Gaussian pyramid is a technique used in image processing, and involves creating a series of images (i.e., from a single image) which are weighted down using a Gaussian average (Gaussian blur) and scaled down. When this technique is used multiple times on an image, it creates a stack or pyramid of successively smaller images, with each pixel containing a local average that corresponds to a pixel neighborhood on a lower level of the pyramid.

It is observed that keypoints detected in higher scales correspond to larger features. As the image resolution decreases (e.g., as the point of view moves further away from a target), finer details are reduced (e.g., eventually becoming undetectable as keypoints) and details which were detected at higher scales (corresponding to coarse details) move to lower scales (corresponding to finer details). The distribution of the keypoints therefore shifts to lower scales as the image resolution is decreased. This observation may be used to obtain an estimate of the size of the image and so make the kernel size radius 'R' proportional to it (e.g., $R\alpha(1/L)$), where L is a scale factor corresponding to the level (counted from top of the scale space pyramid) from which peak density of feature (keypoint) distribution starts. In an exemplary implementation, the scalable factor L may be selected from the set $\{1, 1.5, 2, 2.5, 3, \text{lower\_bound}\}$.

In a training phase, which may be offline, the process of clustering may be performed on database images but with a family of kernels. The kernel R sizes are defined as $\{IX/(20*L), IY/(20*L)\}$, for all $L=\{1, 1.5, 2, 2.5, 3, \text{lower\_bound}\}$. This accounts for scale variations between a query image and database image(s) by clustering the database image(s) with all possible kernel sizes defined by L.

If a significant density of features (keypoints) were detected at higher scale, the resolution of the image would be sufficiently high which will bring L near to 1 and so the kernel R will be of ⅟₂₀th of the dimensions of the image. If significant density of features is detected from a lower scale, L will increase correspondingly decreasing the size of the kernel to account for the decrease in image resolution. In this example, "20" is picked as the baseline since it was observed that at highest resolution (800 pixels by 600 pixels) clustering by a kernel of 1/20th dimension is good for efficient cluster correspondence. This baseline factor may be changed depending on the highest resolution. The scaling factor L extends until the lower_bound. After cardinality (L) scaling steps, further reduction in kernel size signifies a very small image on which recognition or at least meaningful clustering cannot be done. Though the lower bound depends on the number of octaves built, normally lower_bound=4 works well as it is assumed that the object of interest fills at least 1/4th of the maximum resolution.

Figure 14:
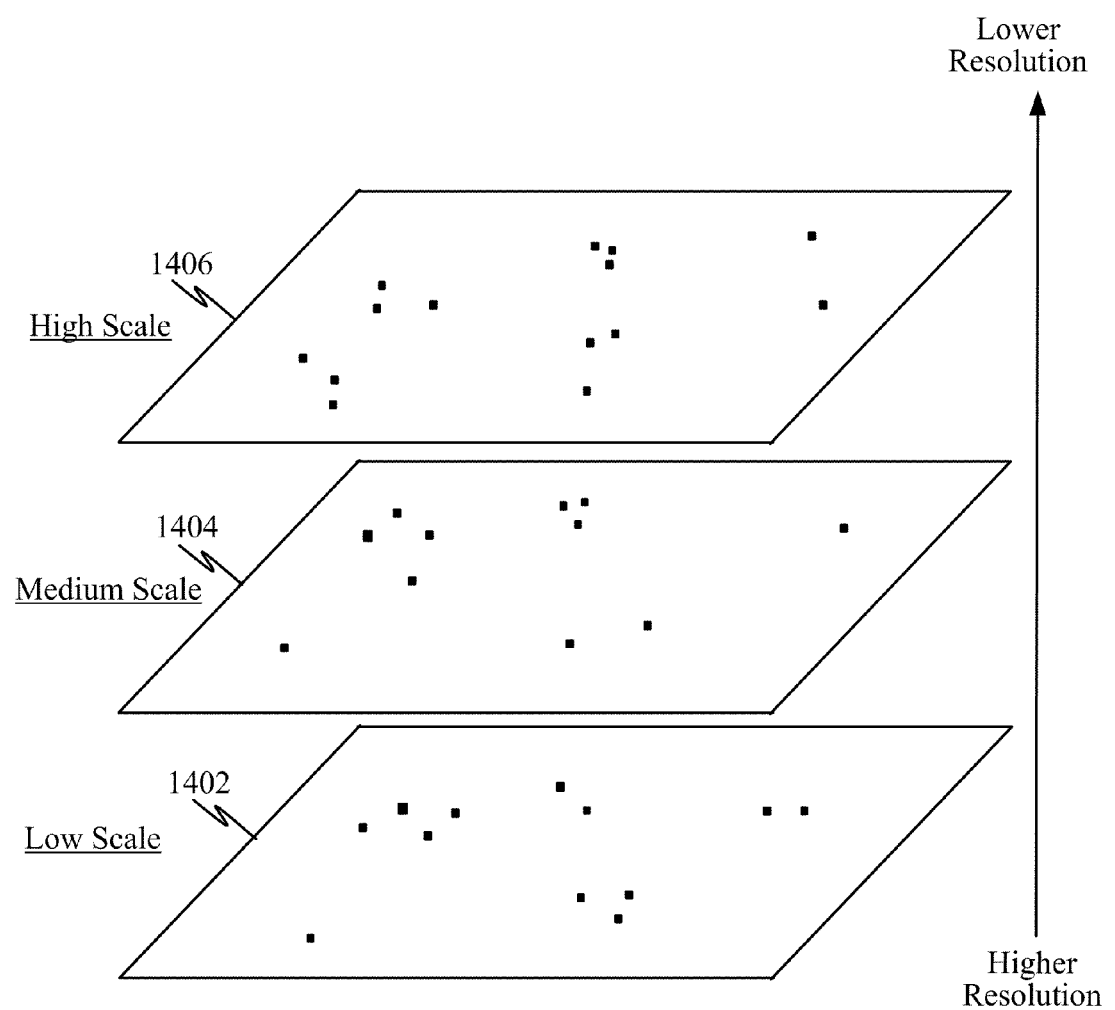
FIG. 14 illustrates an example of keypoint distribution for a high resolution image.

FIG. 14 illustrates an example of keypoint distribution for a high resolution image. Here, a low scale 1402, medium scale 1404, and high scale 1406 of a scale space pyramid are shown for an image. It should be clear that additional image scales may be present in the scale space pyramid. If a significant density of features (keypoints) is detected at higher scales (octaves) of the scale space pyramid for an image, this would indicate the resolution of the image is high. Here, it can be appreciated that a significant percentage of keypoints are present in the higher scale(s) 1406. That is, the keypoint density or distribution is fairly uniform across the high 1406, medium 1404, and low 1402 scales. Therefore, it can be assumed that this image has a relatively high resolution (which allows keypoint detection across a plurality of scales).

Figure 15:
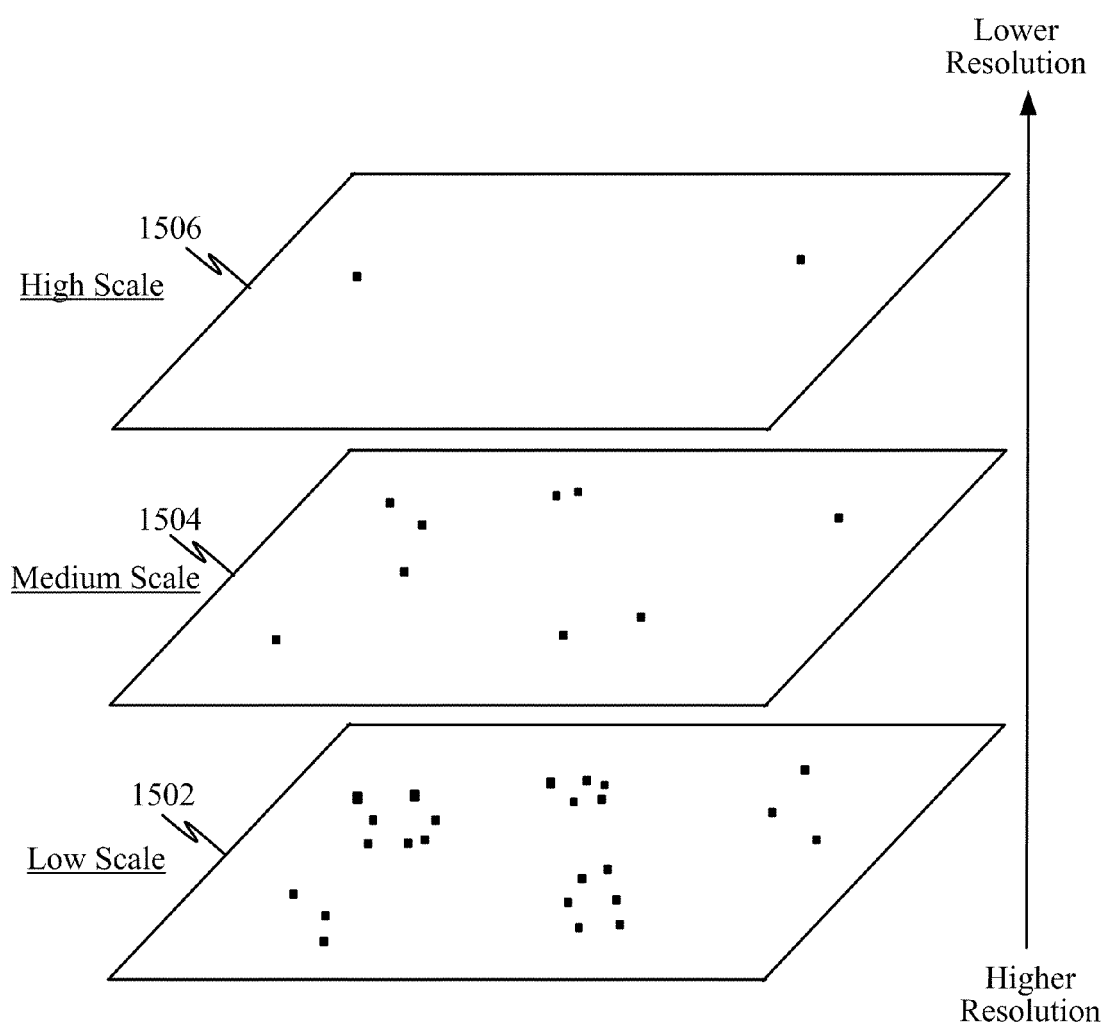
FIG. 15 illustrates an example of keypoint distribution for a low resolution image.

FIG. 15 illustrates an example of keypoint distribution for a low resolution image. Here, a low scale 1502, medium scale 1504, and high scale 1506 of a scale space pyramid are shown for an image. If a significant density of features is detected at lower scales (octaves) of the scale space pyramid (e.g., Gaussian pyramid), this would indicate the resolution of the image is low. That is, as the image resolution decreases, finer features are reduced and details which were detected at higher scales (corresponding to course features) move to lower scales. Here, it can be appreciated that no significant percentage of keypoints are present in the higher scale(s) 1506. That is, the keypoint density or distribution is centered at lower scale(s) 1502. Therefore, it can be assumed that this image has a relatively low resolution.

Thus, peak(s) in the keypoint distribution can be used to track the dominant image scale and roughly track the object size. This observation is used to get an estimate of the size of the object and so make a kernel size radius R proportional to it. Specifically, object size is selected by the minimum scale level that includes a certain threshold percentage of all keypoints detected at this or lower scale. In various examples, this percentage may be in the range of 30% to 50% (e.g., 40%).

In one example, the kernel size radius R may be given by:

$$R \alpha \frac{1}{\sigma_{max} - \sigma_{obj} + 1}, \quad \text{(Equation 13)}$$

where $\sigma_{max}$ is the maximum scale level in the pyramid and $\sigma_{obj}$ is the estimated object scale. Here, $\sigma_{max}$ depends on the resolution of the object image. In general, if the resolution of the object image is m by n pixels the kernel size is given by:

$$R = \frac{(k * \min(m, n))}{\sigma_{max} - \sigma_{obj} + 1}, \quad \text{(Equation 14)}$$

where k is a scaling factor (e.g., k=1/20). For an object image with $\sigma_{obj} = \sigma_{max}$, a kernel size of 1/20th of the image size is sufficient to represent the clusters in the image. Note that as the object image resolution $\sigma_{obj}$ decreases, radius R also decreases as ($\sigma_{max} - \sigma_{obj} - 1$) increases.

Figure 16:
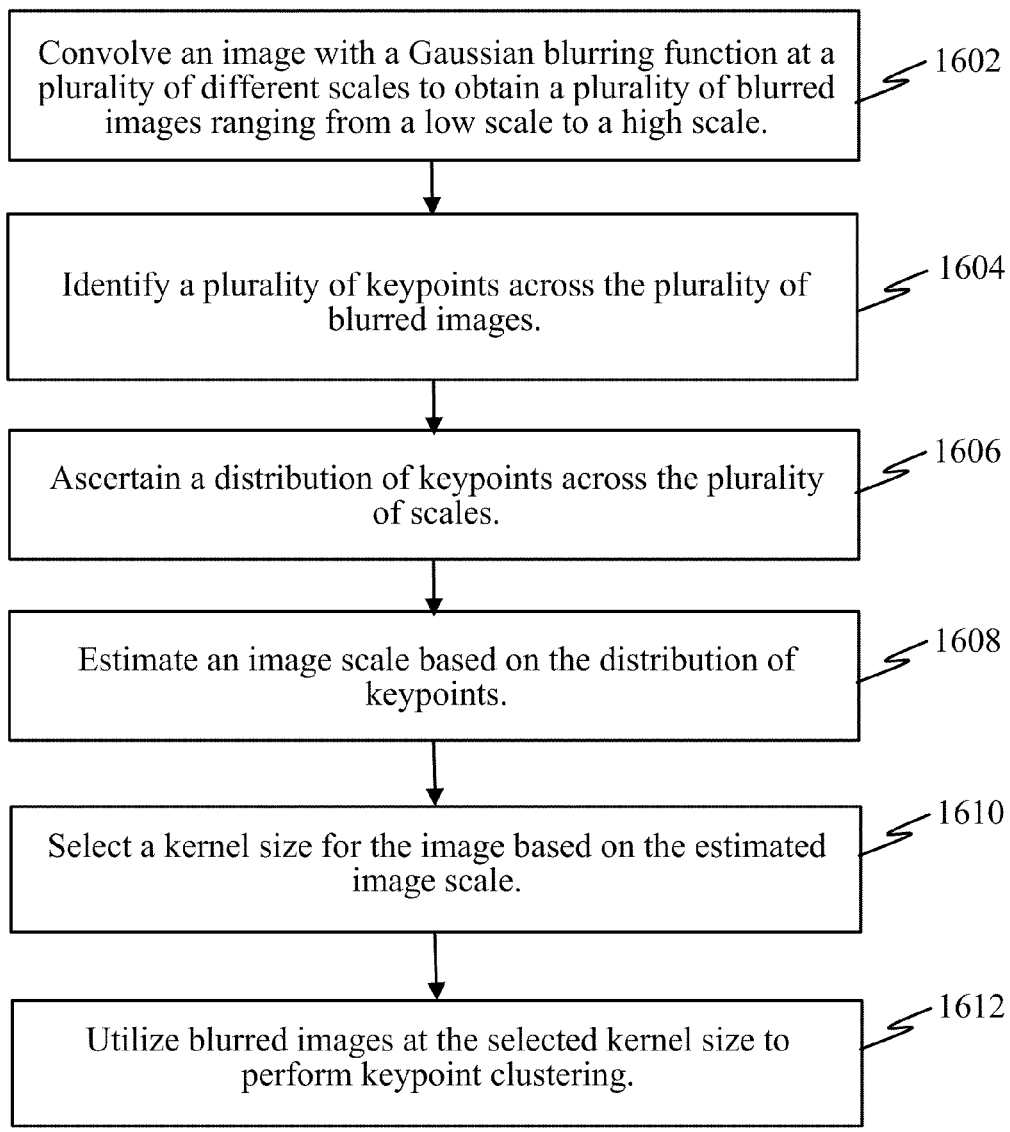
FIG. 16 illustrates a method for kernel scaling of images that facilitates performing cluster correspondence.

FIG. 16 illustrates a method for kernel scaling of images that facilitates performing cluster correspondence. For any given image there is a distribution of the detected keypoints along the scale space pyramid (FIG. 3). For example, an image may be convolved with a blurring function at a plurality of different scales to obtain a plurality of blurred images ranging from a low scale to a high scale 1602. A plurality of keypoints may then be identified across the plurality of blurred images 1604. A distribution (e.g., concentration) of keypoints may then be ascertained across the plurality of scales 1606. An image size may then be estimated based on the distribution of keypoints 1608. A kernel size for the image may then be selected based on the estimated image size 1610. Blurred images at the selected kernel size may then be utilized to perform keypoint clustering 1612.

Pruning Clusters Based on Density and/or Keypoints Based on Scale

In some instances, it may be possible to match features from a query image to a target image based on just a subset of keypoints available. For instance, five hundred keypoints may have been identified for an image but just one hundred (100) or two hundred (200) may actually be needed to perform image or object matching. Reducing the number of keypoints helps reduce the processing needed for object/image recognition. Two approaches to reducing keypoint include pruning keypoints based on cluster density and pruning keypoints based on scale.

Figure 17:
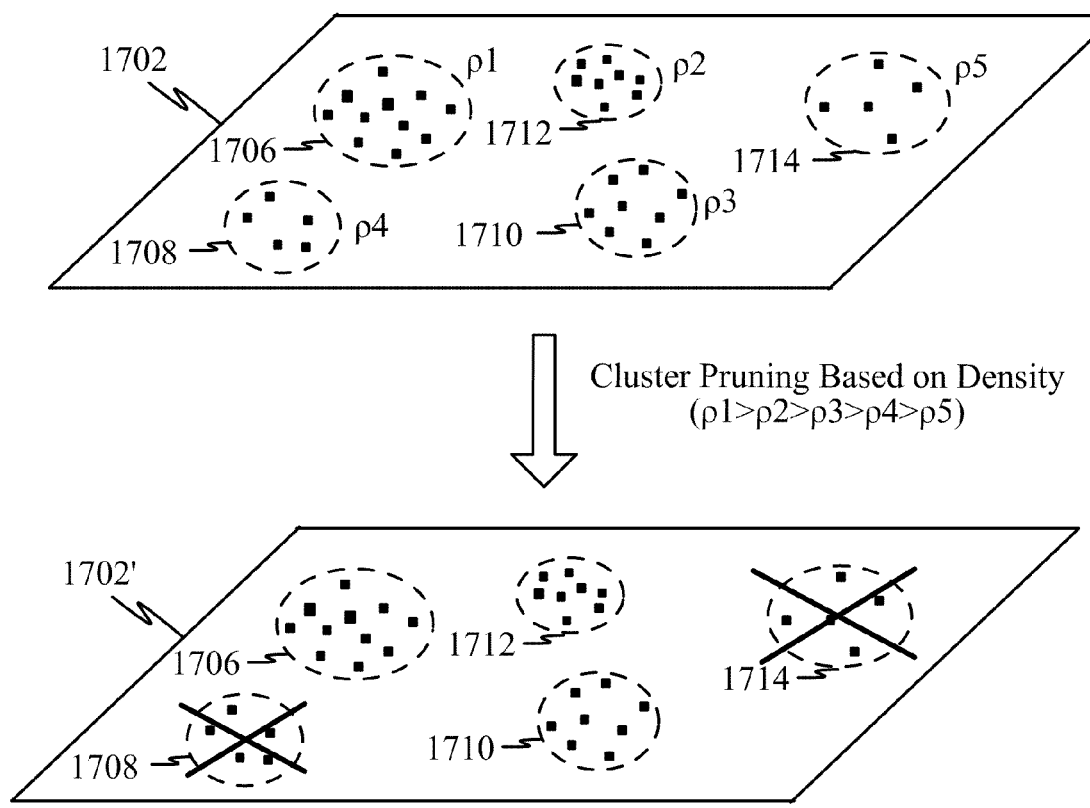
FIG. 17 illustrates cluster pruning based on keypoint density.

FIG. 17 illustrates cluster pruning based on keypoint density. It has been observed that high density clusters tend to include more features of interest. In order to reduce the keypoint clusters that are used for matching between a query image 1702 and a target image, those keypoint clusters having a higher density of keypoints are selected while the remaining keypoint clusters are pruned or ignored. The selected keypoint clusters are then used for matching between the query image and the target image. In this example, a plurality of keypoint clusters 1706, 1708, 1710, 1712, and 1714 are identified in the query image 1702, each cluster having a keypoint density $\rho 1, \rho 2, \rho 3, \rho 4$, and $\rho 5$, respectively, where $\rho 1 > \rho 2 > \rho 3 > \rho 4 > \rho 5$. The query clusters may be ranked according to the keypoint density. In this example, the three highest density clusters 1706, 1708, and 1710 are selected for the query image 1702' while the lowest density clusters 1710 and 1712 may be pruned or ignored. The selected keypoint clusters 1706, 1708, and 1710 may then be used for matching between the query image and one or more target images.

In addition to keypoint density, keypoints occurring at higher scales may be ranked higher than keypoints occurring at lower. That is, keypoints detected at higher scales (i.e., lower resolution) may be preserved while keypoints detected at lower scales (i.e., higher resolution) may be pruned.

Figure 18:
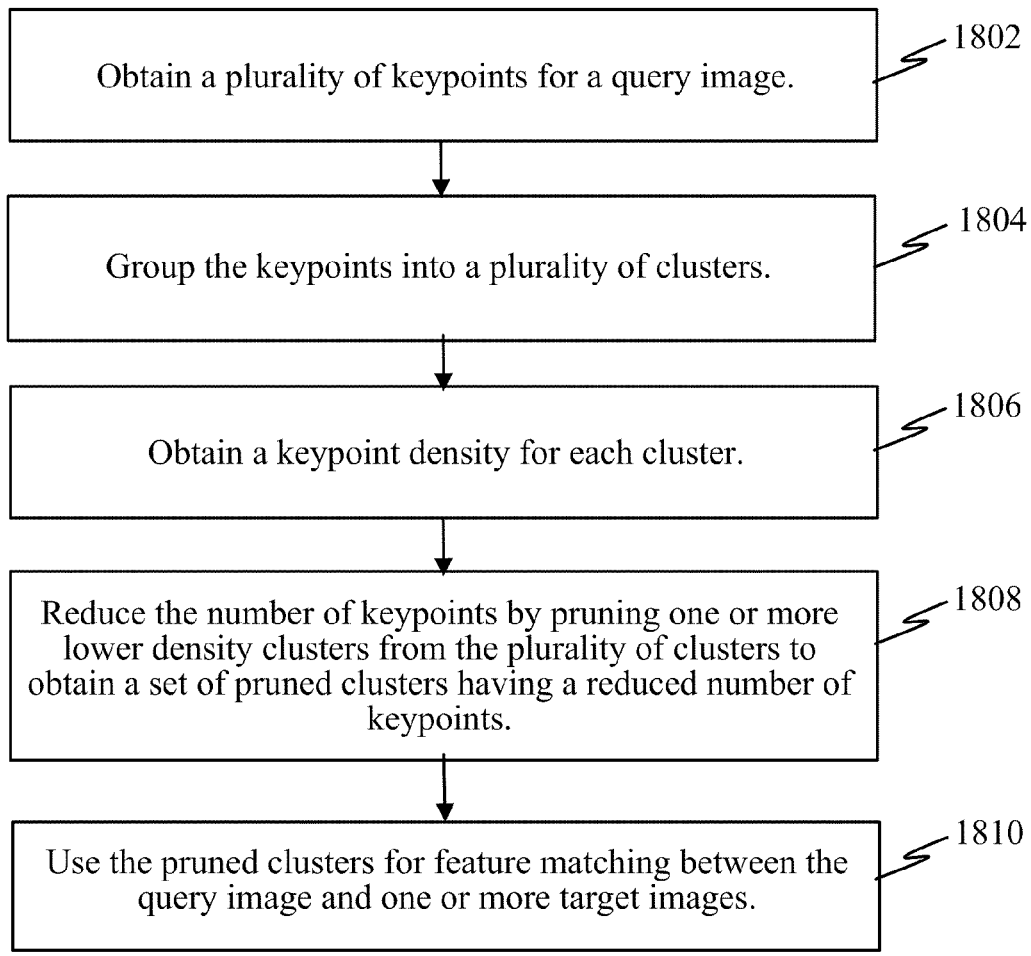
FIG. 18 is a method for reducing keypoints for a query image by pruning keypoint clusters based on keypoint density.

FIG. 18 is a method for reducing keypoints for a query image by pruning keypoint clusters based on keypoint density. First, a plurality of keypoints may be obtained for a query image 1802. Such keypoints may be detectable over one or more scales and may be, for example, highly distinctive features (e.g., pixel having local maxima and minima, high contrast, etc.). The keypoints are then grouped into a plurality of clusters 1804. For example, non-parametric density estimation process, mean shift analysis may be used for grouping the keypoints into clusters. Then, a keypoint density may be obtained for each cluster 1806. One or more low density clusters from the plurality of clusters may then be removed or ignored to obtain a set of pruned clusters having a reduced number of keypoints 1808. The pruned clusters may then be used for feature matching between the query image and one or more target images 1810.

Figure 19:
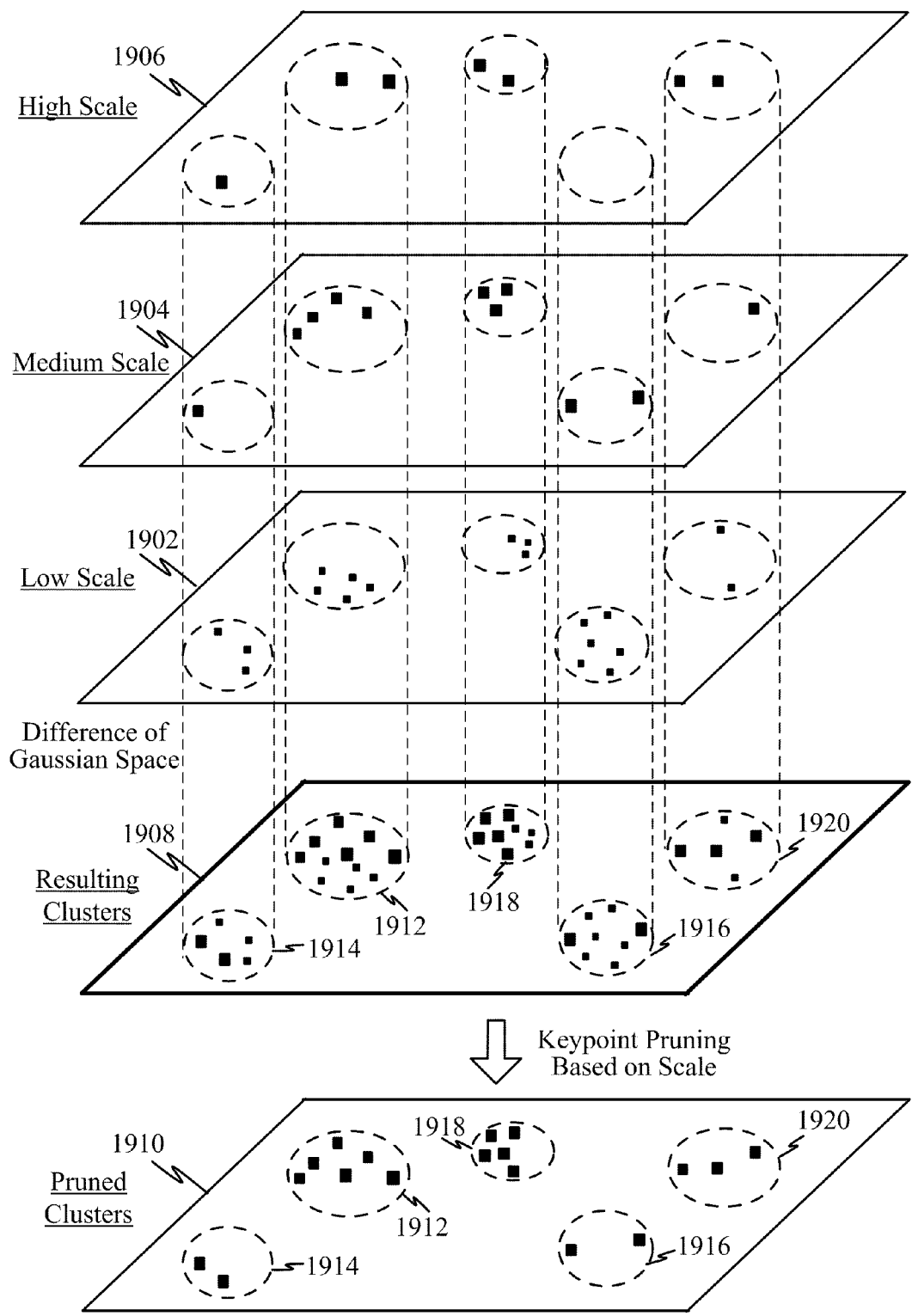
FIG. 19 illustrates a method of keypoint pruning based on keypoint scale.

FIG. 19 illustrates a method of keypoint pruning based on keypoint scale. Keypoints are detectable at various scales (e.g., Difference of Gaussian Scale Space). The keypoints across different scales and in the same region may be combined into a cluster. Higher scales may be generated by blurring an image more than at lower scales. In this example, a query image has been blurred to generate a low scale 1902, medium scale 1904, and high scale 1906 version of the query image. The resulting clusters 1908 for the query image may thus include keypoints detected at different scales. It has been observed that keypoints detected are higher scales are more robust and stable for purposes of keypoint matching. Therefore, in this approach, keypoints detected at higher scales are preserved and keypoints at lower scales are pruned or ignored for purposes of keypoint matching. Note that some keypoints may be detectable in different scales. In such cases, the highest scale at which a keypoint is detected is used. In this example, a plurality of clusters 1912, 1914, 1916, 1918, and 1920 may include keypoints from across a plurality of scales (e.g., a low scale 1902, a medium scale 1904, and a high scale 1906) of the query image. In this example, the keypoints identified in the low scale 1902 are removed from the resulting clusters 1908 to obtain pruned clusters 1910. Thus, the pruned clusters include only keypoints detectable at the medium and high scales 1904 and 1906. The keypoints in the pruned clusters 1910 may then be used for matching between the query image and one or more target images.

Figure 20:
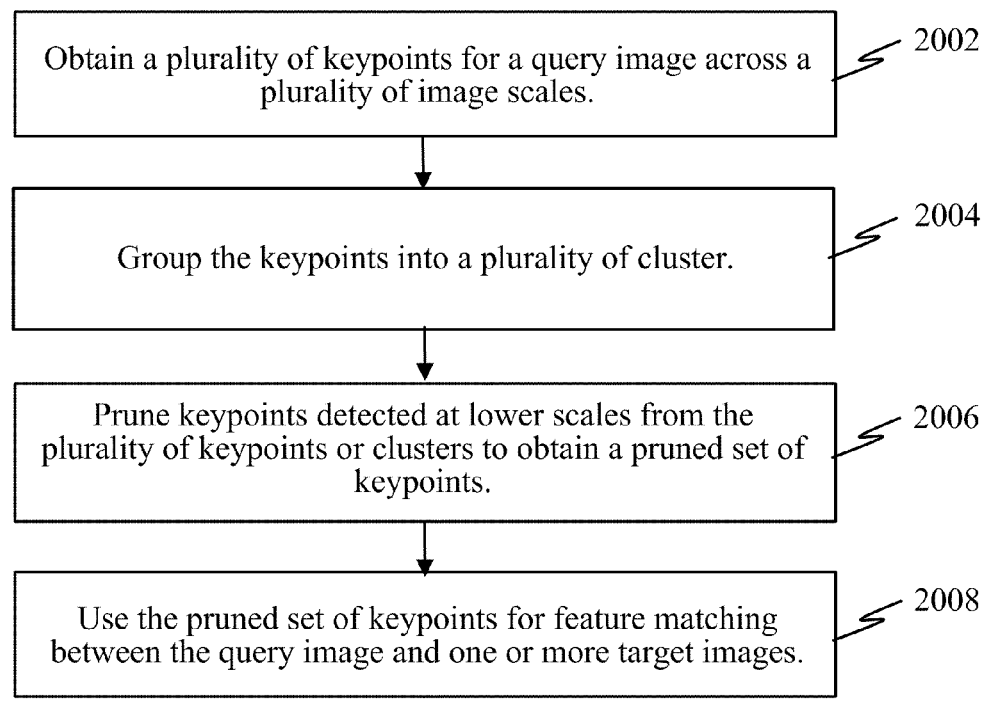
FIG. 20 is a method for reducing keypoints for a query image by pruning keypoint clusters based on keypoint density.

FIG. 20 is a method for reducing keypoints for a query image by pruning keypoint clusters based on keypoint density. A plurality of keypoints may be obtained for a query image across a plurality of image scales 2002. Such keypoints may be detectable over one or more scales and may be, for example, highly distinctive features (e.g., pixel having local maxima and minima, high contrast, etc.). The keypoints may optionally be grouped into a plurality of clusters 2004. For example, non-parametric density estimation process, mean shift analysis may be used for grouping the keypoints into clusters. Then, keypoints detected at lower scales may be pruned from the plurality of keypoints or clusters to obtain a pruned set of keypoints 2006. The pruned set of keypoints may then be used for feature matching between the query image and one or more target images 2008.

In various implementations, both cluster pruning and keypoint pruning approaches described herein may be combined in either sequence or order. For example, cluster pruning may be performed first and then keypoint pruning may be performed for a query image. In another example, keypoint pruning may be performed first and then cluster pruning may be performed for a query image.

Exemplary Image Matching Device

Figure 21:
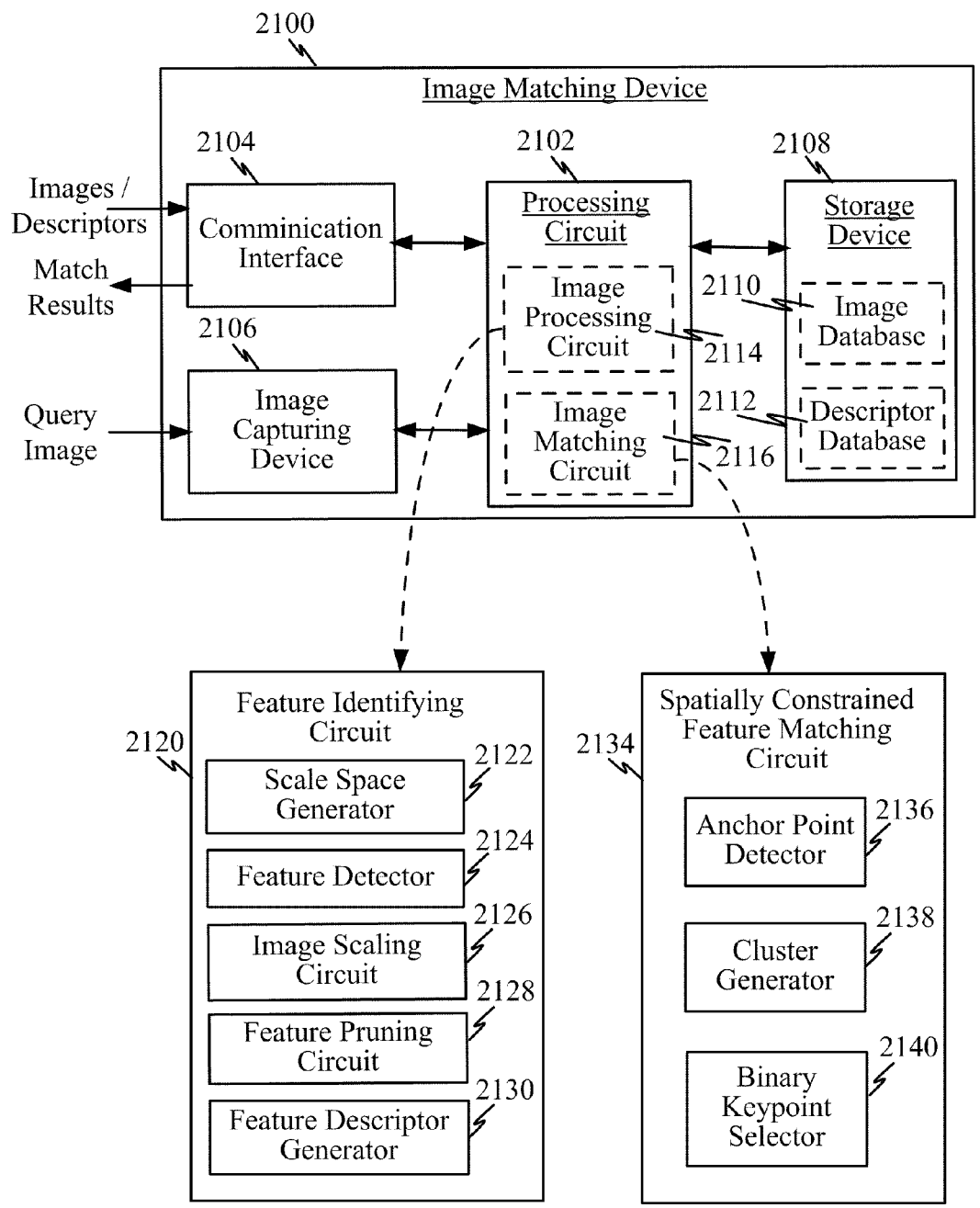
FIG. 21 is a block diagram illustrating an example of an image matching device.

FIG. 21 is a block diagram illustrating an example of an image matching device. The image matching device 2100 may include a processing circuit 2102, coupled to a communication interface 2104, an image capturing device 2106, and/or a storage device 2108. The communication interface 2104 may be adapted to communicate over a wired/wireless network and receive images and/or feature descriptors for one or more images. The image capturing device 2106 may be, for example, a digital camera that can capture a query image. The processing circuit 2102 may include an image processing circuit 2114 to extract features from images and an image matching circuit 2116 that uses the extracted features to match a query image to a database of target images 2110 and/or query image descriptors to a descriptor database 2112. According to one exemplary implementation, an image matching application attempts to match a query image to one or more images in an image database. The image database may include millions of feature descriptors associated with the one or more images stored in the database 2110.

The image processing circuit 2114 may include a feature identifying circuit 2120 that includes a scale space generator 2122, a feature detector 2124, an image scaling circuit 2126, a feature pruning circuit 2128, and/or a feature descriptor extractor 2130. The scale space generator 2122 may serve to convolve an image with a blurring function to generate a plurality of different scale spaces (e.g., a Gaussian scale space pyramid) as illustrated, for example, in FIG. 3. The feature detector 2124 may then identify one or more keypoints in the different scale spaces for the image (e.g., by using local maxima and minima as illustrated in FIG. 4). The image scaling circuit 2126 may serve to approximate the scale of an image in order to select an appropriate kernel size at which to perform feature detection and/or clustering. The feature pruning circuit 2128 reduces the number of keypoints that are matched by using/selecting only keypoints in higher density clusters (FIG. 17) and/or favoring keypoints detected in higher scales (FIG. 19). The feature descriptor generator 2130 generates a descriptor for each keypoint and/or its surrounding patch (e.g., illustrated in FIG. 5).

The image matching circuit 2116 may include a spatially constrained feature matching circuit 2134 that includes an anchor point detector 2136, a cluster generator 2138, and/or a binary keypoint selector 2140. The anchor point detector 2136 may serve to identify highly correlated keypoints (e.g., matches above a high threshold), referred to as anchor points (illustrated in FIGS. 8, 11 and 12). The cluster generator 2138 then performs cluster matching between a query image and a target image (illustrated in FIGS. 8, 11 and 12). Once cluster matching has been ascertained, the binary keypoint selector 2140 performs add keypoints to query clusters based on a binary decision (illustrated in FIGS. 8, 11 and 12). The resulting query clusters may then be used in determining an image or object match. A match result may be provided via the communication interface 21 (e.g., to a mobile device that send the image or feature descriptors).

Note that, in some implementations, a set of feature descriptors associated with keypoints for a query image may be received by the image matching device. In this situation, the query image has already been processed (to obtain the descriptors). Therefore, the image processing circuit 2114 may be bypassed or removed from the image matching device 2100.

Exemplary Mobile Device

Figure 22:
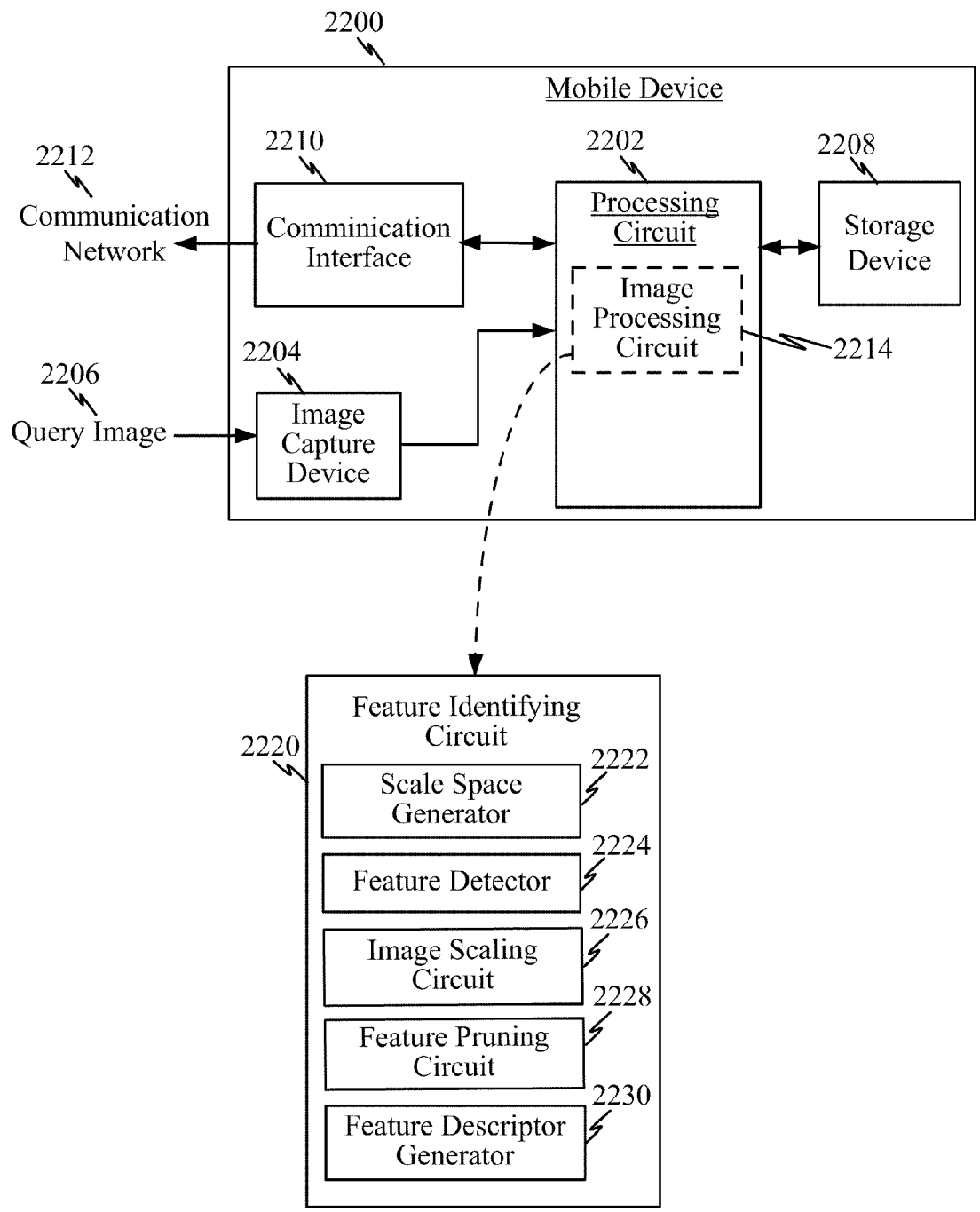
FIG. 22 is a block diagram illustrating an exemplary mobile device adapted to perform image processing for purposes of image or object recognition.

FIG. 22 is a block diagram illustrating an exemplary mobile device adapted to perform image processing for purposes of image or object recognition. The mobile device 2200 may include a processing circuit 2202 coupled to an image capture device 2204, a communication interface 2210 and a storage device 2208. The image capture device 2204 (e.g., digital camera) may be adapted to capture a query image 2206 of interest and provides it to the processing circuit 2202. The processing circuit 2202 may be adapted to process the captured image to generate feature descriptors that can be subsequently transmitted or used for image/object recognition.

For example, the processing circuit 2202 may include or implement a feature identifying circuit 2220 that includes a scale space generator 2222, a feature detector 2224, an image scaling circuit 2226, a feature pruning circuit 2228, and/or a feature descriptor extractor 2230. The scale space generator 2222 may serve to convolve an image with a blurring function to generate a plurality of different scale spaces (e.g., Gaussian scale space pyramid) as illustrated, for example, in FIG. 3. The feature detector 2224 may then identify one or more keypoints in the different scale spaces for the image (e.g., by using local maxima and minima as illustrated in FIG. 4). The image scaling circuit 2226 may serve to approximate the scale of an image in order to select an appropriate kernel size at which to perform feature detection and/or clustering. The feature pruning circuit 2228 reduces the number of keypoints that are matched by using/selecting only keypoints in higher density clusters (FIG. 17) and/or favoring keypoints detected in higher scales (FIG. 19). The feature descriptor generator 2230 generates a descriptor for each keypoint and/or its surrounding patch (e.g., illustrated in FIG. 5).

The processing circuit 2202 may then store the one or more feature descriptors in the storage device 2208 and/or may also transmit the feature descriptors over the communication interface 2210 (e.g., a wireless communication interface, transceiver, or circuit) through a communication network 2212 to an image matching server that uses the feature descriptors to identify an image or object therein. That is, the image matching server may compare the feature descriptors to its own database of feature descriptors to determine if any image in its database has the same feature(s).

Figure 23A:
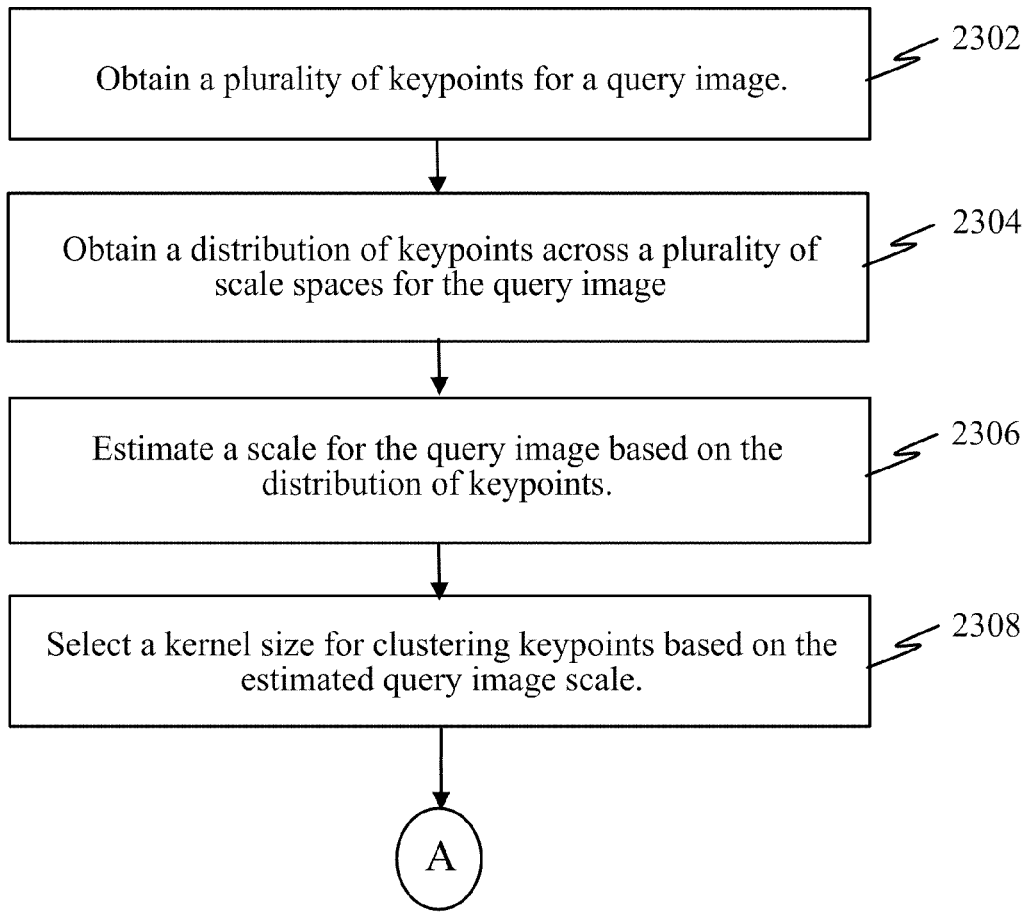
FIG. 23 (comprising FIGS. 23A, 23B, and 23C) is a flow diagram illustrating a method for image scaling, feature pruning, and/or spatially constrained feature matching as part of an object recognition process.
Figure 23B:
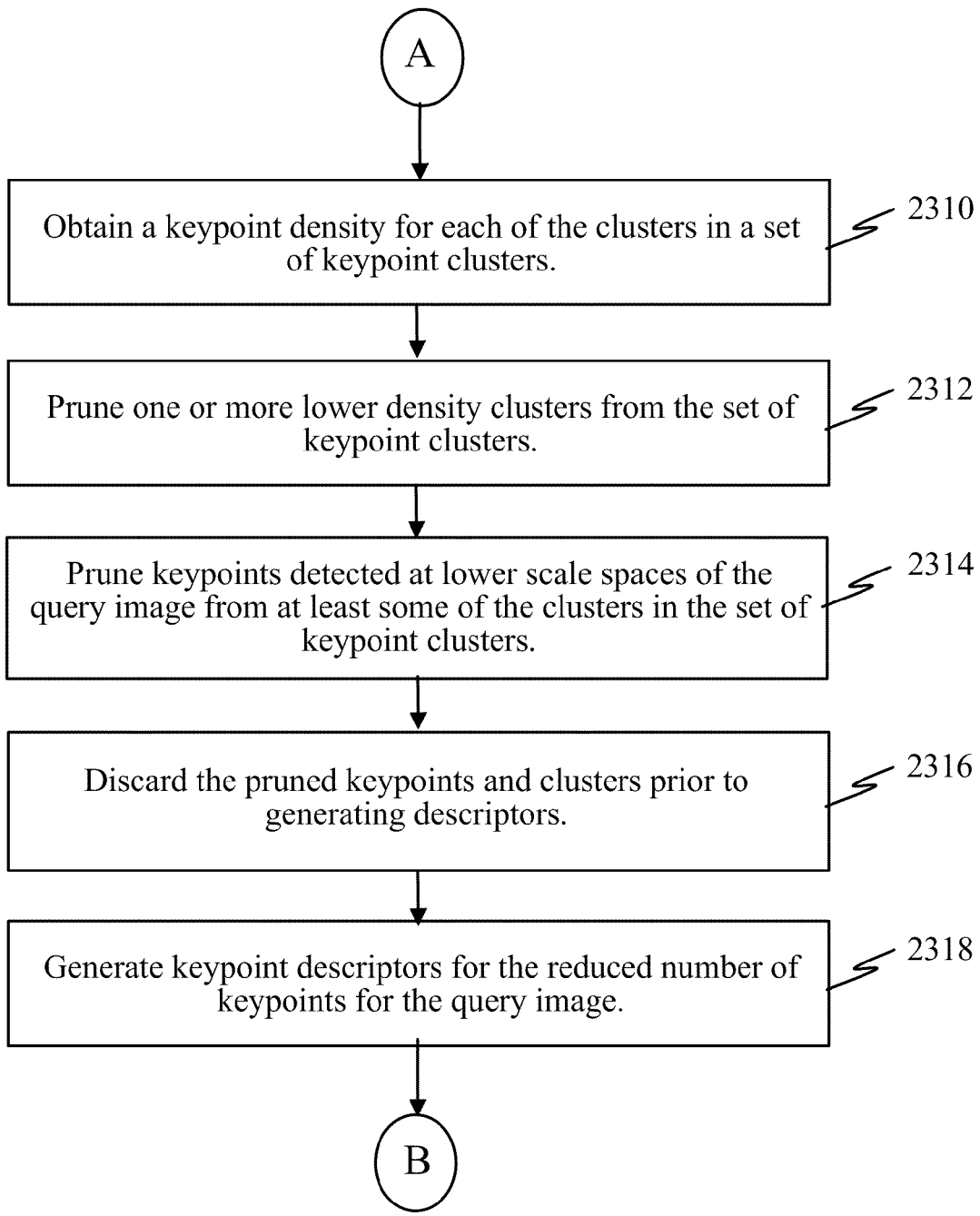
Figure 23C:
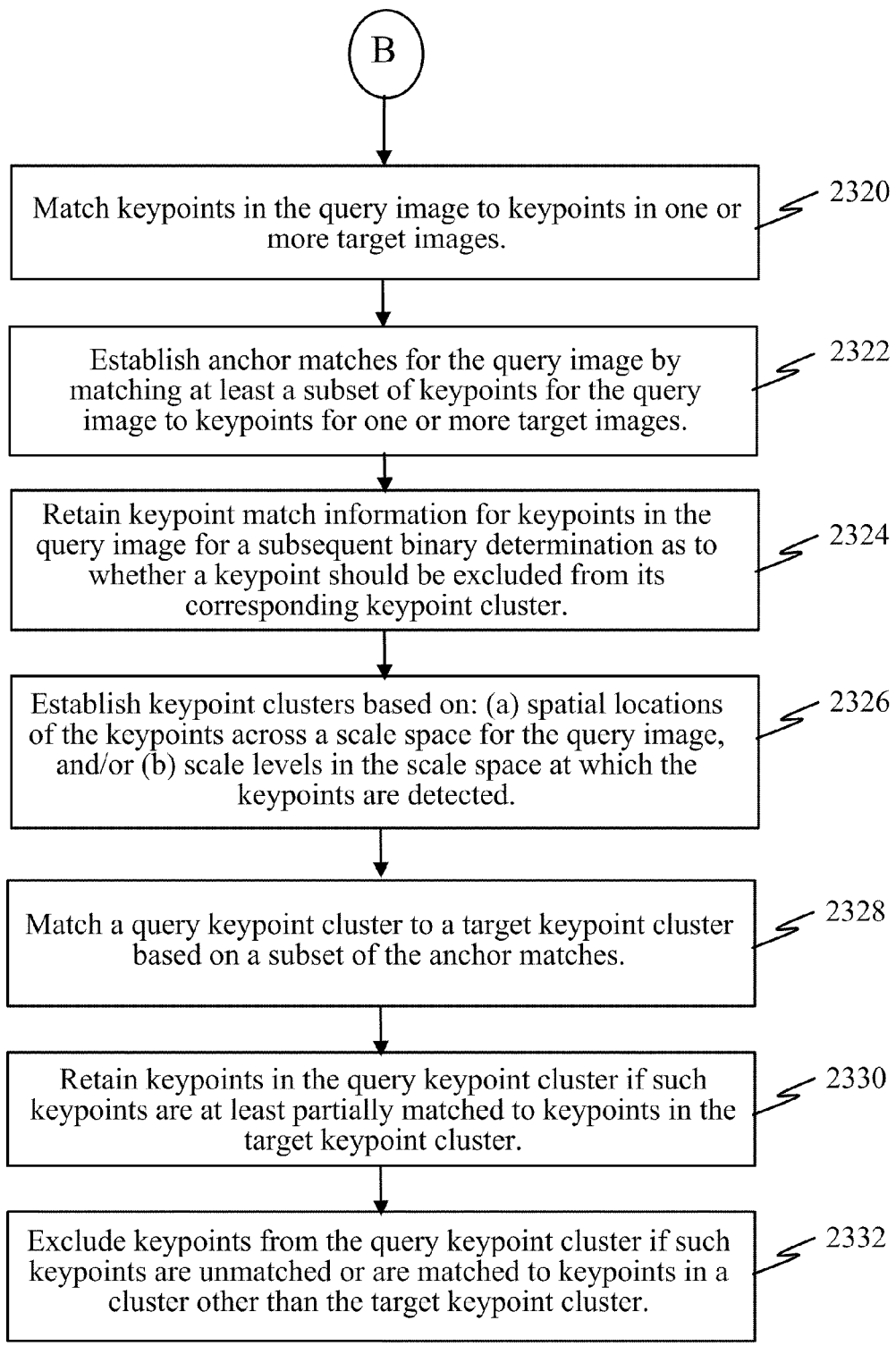

FIG. 23 (comprising FIGS. 23A, 23B, and 23C) is a flow diagram illustrating a method for image scaling, feature pruning, and/or spatially constrained feature matching as part of an object recognition process. Note that aspects of this method may be implemented independent of, or in combination with, other aspects of this method. This method may be implemented by one or more of the components illustrated in FIGS. 21 and/or 22.

Initially, image scaling may be performed to obtain an approximate scale for the image. A plurality of keypoints may be obtained for a query image 2302. For example, keypoints may be obtained across a plurality of scale spaces corresponding to blurred versions of the query image. A distribution of keypoints may then be obtained across a plurality of scale spaces for the query image 2304. A scale for the query image may then be estimated based on the distribution of keypoints 2306. In one example, the image scale is estimated from the distribution of the keypoints over the scale spaces such that a cutoff scale preserves a threshold percentage (e.g., 70%, 75%, 80%, 85%, 90%, or 95%) of keypoints within the space scales up to the cutoff scale. A kernel size may then be selected for clustering keypoints based on the estimated query image scale 2308. Blurred versions of the query image may then be used at the selected kernel size to perform keypoint clustering.

Next, keypoint pruning may then be performed. First, a keypoint density may be obtained for each of the clusters in a set of keypoint clusters 2310 for the query image. For instance, the set of keypoint clusters for the query image may be defined based on keypoint distribution (where closely located keypoints are grouped together). The number of keypoints for the query image may be reduced by: pruning one or more lower density clusters from the set of keypoint clusters 2312, and/or pruning keypoints detected at lower levels of scale spaces of the query image from at least some of the clusters in the first set of keypoint clusters 2314. The pruned keypoints and clusters may be discarded prior to generating descriptors 2316. Descriptors may then be generated for the reduced number of keypoints for the query image 2318. The descriptors for the reduced number of keypoints may be transmitted to a feature matching device to match the query image or object in the query image to target images.

Feature matching may then be performed using cluster-based keypoint matching. Keypoints in the query image may be matched to keypoints in one or more target images 2320. Note that keypoints may be represented by descriptors which are used for keypoint matching. Anchor matches may then be established for the query image by matching at least a subset of keypoints for the query image to keypoints for one or more target images 2322. Anchor matches may be keypoints matches that are matched beyond a threshold with keypoints in one or more target images. Establishing anchor matches may include retaining keypoint match information for keypoints in the query image for a subsequent binary determination as to whether a keypoint should be excluded from its corresponding keypoint. Keypoint clusters may then be established based on: (a) spatial locations of the keypoints across a scale space for the query image, and/or (b) scale levels in the scale space at which the keypoints are detected 2326. A query keypoint cluster may be matched to a target keypoint cluster based on a subset of the anchor matches 2328. Keypoints may be retained in the query keypoint cluster if such keypoints are at least partially matched to keypoints in the target keypoint cluster 2330. Keypoints may be excluded from the query keypoint cluster if such keypoints are unmatched or are matched to keypoints in a cluster other than the target keypoint cluster 2332.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in a figure may be configured to perform one or more of the methods, features, or steps described in another figure. The algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the described tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method for feature matching in image recognition, comprising:
    obtaining a plurality of keypoints for a query image;
    defining a set of keypoint clusters for the query image based on keypoint distribution;
    establishing anchor matches for the query image by matching at least a subset of keypoints for the query image to keypoints for one or more target images, where the anchor matches are keypoints matches that are matched beyond a threshold with keypoints in one or more target images, and a keypoint match below the threshold is a partial match for the corresponding one or more target images;
    matching a query keypoint cluster to a target keypoint cluster based on the anchor matches for the target keypoint cluster, where keypoints that are partial matches are excluded from the query keypoint cluster during the cluster matching; and
    retaining keypoints, which were previously excluded from the query keypoint cluster as partial matches for purposes of cluster matching, as part of the query keypoint cluster for a subsequent geometric verification operation.

2. The method of claim 1, wherein such threshold is selected so as to exclude outlier matches, where outlier matches are false positive keypoint matches.

3. The method of claim 1, wherein anchor matches are keypoint matches for keypoints in the query image that occur within a selected subset of scale space levels for the query image.

4. The method of claim 1, wherein the partially matched keypoints are retained in the query keypoint cluster based on a binary decision on whether a partial match has been found for the keypoint and such match is within the target keypoint cluster.

5. The method of claim 1, wherein anchor matches are those keypoint matches that are matched at least partially based on local pixel information around each of the subset of keypoints for the query image.

6. The method of claim 5, wherein the local pixel information includes at least one of pixel gradient, pixel color, cluster shape, or keypoint distribution.

7. The method of claim 1, wherein establishing anchor matches includes:
    matching keypoints in the query image to keypoints in the target images;
    excluding partially matched keypoints from the query keypoint cluster for purposes of cluster matching; and
    retaining keypoint match information for keypoints in the query image for a subsequent binary determination as to whether a keypoint should be excluded from its corresponding keypoint cluster.

8. The method of claim 1, further comprising:
    excluding keypoints from the query keypoint cluster if such keypoints are unmatched or are matched to keypoints in a cluster other than the target keypoint cluster.

9. The method of claim 1, wherein a keypoint is a local maxima pixel or a local minima pixel in a scale space for the query image.

10. The method of claim 1, wherein keypoints are ascertained across a plurality of scale spaces corresponding to blurred versions of the query image.

11. The method of claim 1, wherein keypoints are represented by descriptors which are used for keypoint matching.

12. The method of claim 1, wherein keypoints are clustered based on at least one of:
   spatial locations of the keypoints across a scale space for the query image, or
   scale levels in the scale space at which the keypoints are detected.

13. The method of claim 1, wherein the keypoints for the query image are obtained across a plurality of image scale spaces, and further comprising:
   reducing the number of keypoints for the query image by one of either:
      pruning one or more lower density clusters from the set of keypoint clusters, or
      pruning keypoints detected at lower levels of scale spaces of the query image from at least some of the clusters in the set of keypoint clusters.

14. The method of claim 13, further comprising:
   generating descriptors for the reduced number of keypoints for the query image.

15. The method of claim 14, further comprising:
   discarding the pruned keypoints and clusters prior to generating descriptors.

16. The method of claim 14, further comprising:
   transmitting the descriptors for the reduced number of keypoints to a feature matching device to match the query image or object in the query image to target images.

17. The method of claim 13, further comprising:
   obtaining a keypoint density for each of the clusters in the set of keypoint clusters.

18. The method of claim 1, further comprising:
   obtaining a distribution of keypoints across a plurality of scale spaces for the query image; and
   estimating a scale for the query image based on the distribution of keypoints.

19. The method of claim 18, wherein the image scale is estimated from the distribution of the keypoints over the scale spaces such that a cutoff scale preserves a threshold percentage of keypoints within the space scales up to the cutoff scale.

20. The method of claim 18, further comprising:
   selecting a kernel size for clustering keypoints based on the estimated query image scale.

21. The method of claim 20, further comprising:
   utilizing blurred versions of the query image at the selected kernel size to perform keypoint clustering.

22. A feature matching device, comprising:
   a storage device storing information for a plurality of target images;
   a processing circuit coupled to the storage device, the processing circuit adapted to:
      obtain a plurality of keypoints for a query image;
      define a set of keypoint clusters for the query image based on keypoint distribution;
      establish anchor matches for the query image by matching at least a subset of keypoints for the query image to keypoints for one or more target images, where the anchor matches are keypoints matches that are matched beyond a threshold with keypoints in one or more target images, and a keypoint match below the threshold is a partial match for the corresponding one or more target images;
      match a query keypoint cluster to a target keypoint cluster based on the anchor matches for the target keypoint cluster, where keypoints that are partial matches are excluded from the query keypoint cluster during the cluster matching; and
      retaining keypoints, which were previously excluded from the query keypoint cluster as partial matches for purposes of cluster matching, as part of the query keypoint cluster for a subsequent geometric verification operation.

23. The feature matching device of claim 22, wherein the threshold is selected so as to exclude outlier matches, where outlier matches are false positive keypoint matches.

24. The feature matching device of claim 22, wherein anchor matches are keypoint matches for keypoints in the query image that occur within a selected subset of scale space levels for the query image.

25. The feature matching device of claim 23, wherein the processing circuit is further adapted to:
   retain the partially matched keypoints in the query keypoint cluster based on a binary decision on whether a partial match has been found for the keypoint and such match is within the target keypoint cluster.

26. The feature matching device of claim 22, wherein the processing circuit is further adapted to establish the anchor matches by:
   matching keypoints in the query image to keypoints in the target images;
   excluding partially matched keypoints from the query keypoint cluster for purposes of cluster matching; and
   retaining keypoint match information for keypoints in the query image for a subsequent binary determination as to whether a keypoint should be excluded from its corresponding keypoint cluster.

27. The feature matching device of claim 22, further comprising:
   an image capturing device for capturing the query image.

28. The feature matching device of claim 22, wherein the keypoints for the query image are obtained across a plurality of image scale spaces, and the processing circuit is further adapted to:
   reduce the number of keypoints for the query image by at least one of either:
      pruning one or more lower density clusters from the set of keypoint clusters, or
      pruning keypoints detected at lower scale spaces of the query image from at least some of the clusters in the set of keypoint clusters.

29. The feature matching device of claim 28, wherein the processing circuit is further adapted to:
   generate descriptors for the reduced number of keypoints for the query image.

30. The feature matching device of claim 28, further comprising:
   a transmitter adapted to transmit the descriptors for the reduced number of keypoints to a feature matching device to match the query image or object in the query image to target images.

31. The feature matching device of claim 22, wherein the processing circuit is further adapted to:
   obtain a distribution of keypoints across a plurality of scale spaces for the query image; and
   estimate a scale for the query image based on the distribution of keypoints.

32. A feature matching device, comprising:
   means for obtaining a plurality of keypoints for a query image;

means for defining a set of keypoint clusters for the query image based on keypoint distribution;

means for establishing anchor matches for the query image by matching at least a subset of keypoints for the query image to keypoints for one or more target images, where the anchor matches are keypoints matches that are matched beyond a threshold with keypoints in one or more target images, and a keypoint match below the threshold is a partial match for the corresponding one or more target images;

means for matching a query keypoint cluster to a target keypoint cluster based on the anchor matches for the target keypoint cluster, where keypoints that are partial matches are excluded from the query keypoint cluster during the cluster matching; and mean for retaining keypoints, which were previously excluded from the query keypoint cluster as partial matches for purposes of cluster matching, as part of the query keypoint cluster for a subsequent geometric verification operation.

33. A processor-readable medium comprising one or more instructions operational on a feature matching device, which when executed by a processing circuit, causes the processing circuit to:

obtain a plurality of keypoints for a query image;

define a set of keypoint clusters for the query image based on keypoint distribution;

establish anchor matches for the query image by matching at least a subset of keypoints for the query image to keypoints for one or more target images, where the anchor matches are keypoints matches that are matched beyond a threshold with keypoints in one or more target images, and a keypoint match below the threshold is a partial match for the corresponding one or more target images;

match a query keypoint cluster to a target keypoint cluster based on the anchor matches for the target keypoint cluster, where keypoints that are partial matches are excluded from the query keypoint cluster during the cluster matching; and retain keypoints, which were previously excluded from the query keypoint cluster as partial matches for purposes of cluster matching, as part of the query keypoint cluster for a subsequent geometric verification operation.

* * * * *